(12) United States Patent
Alden

(10) Patent No.: US 6,230,453 B1
(45) Date of Patent: May 15, 2001

(54) VARIABLE VIEW WINDOW

(76) Inventor: Ray M. Alden, 808 Lake Brandon Trail, Raleigh, NC (US) 27610

( * ) Notice: Subject to any disclaimer, the term of this patent is extended or adjusted under 35 U.S.C. 154(b) by 0 days.

(21) Appl. No.: 09/358,175

(22) Filed: Jul. 20, 1999

Related U.S. Application Data

(60) Provisional application No. 60/110,487, filed on Dec. 1, 1998, and provisional application No. 60/111,708, filed on Dec. 10, 1998.

(51) Int. Cl.[7] ..................................................... E06B 7/00
(52) U.S. Cl. ........................ 52/171.3; 52/786.11; 359/832
(58) Field of Search .............................. 52/786.11, 171.3; 359/196, 211, 209, 832, 591, 504, 592

(56) References Cited

U.S. PATENT DOCUMENTS

| | | | |
|---|---|---|---|
| 3,514,192 | * | 5/1970 | De La Cierva . |
| 4,913,536 | * | 4/1990 | Barnea . |
| 5,166,831 | | 11/1992 | Hart ...................................... 359/832 |
| 5,541,776 | | 7/1996 | Kobayashi et al. ................... 359/665 |
| 5,774,273 | | 6/1998 | Barnhorst ............................. 359/665 |
| 5,796,531 | | 8/1998 | Kaneda et al. ....................... 359/832 |

FOREIGN PATENT DOCUMENTS

| | | | |
|---|---|---|---|
| 651495 | * | 10/1962 | (CA) .................................... 359/632 |
| 5134285 | * | 5/1993 | (JP) ...................................... 359/832 |
| 5134286 | * | 5/1993 | (JP) . |

* cited by examiner

Primary Examiner—Blair M. Johnson

(57) ABSTRACT

The variable view window enables a user to change the views possible through a window from a given perspective point. One embodiment includes two variable prisms, temperature regulating element, insulating layer, mounting structures, actuator, and software. Objectives of this new art are to maximize refraction, control dipersion, and minimize physical motion.

24 Claims, 7 Drawing Sheets

VARIABLE VIEW WINDOW

CROSS-REFERENCE TO RELATED APPLICATIONS

Figure 1:
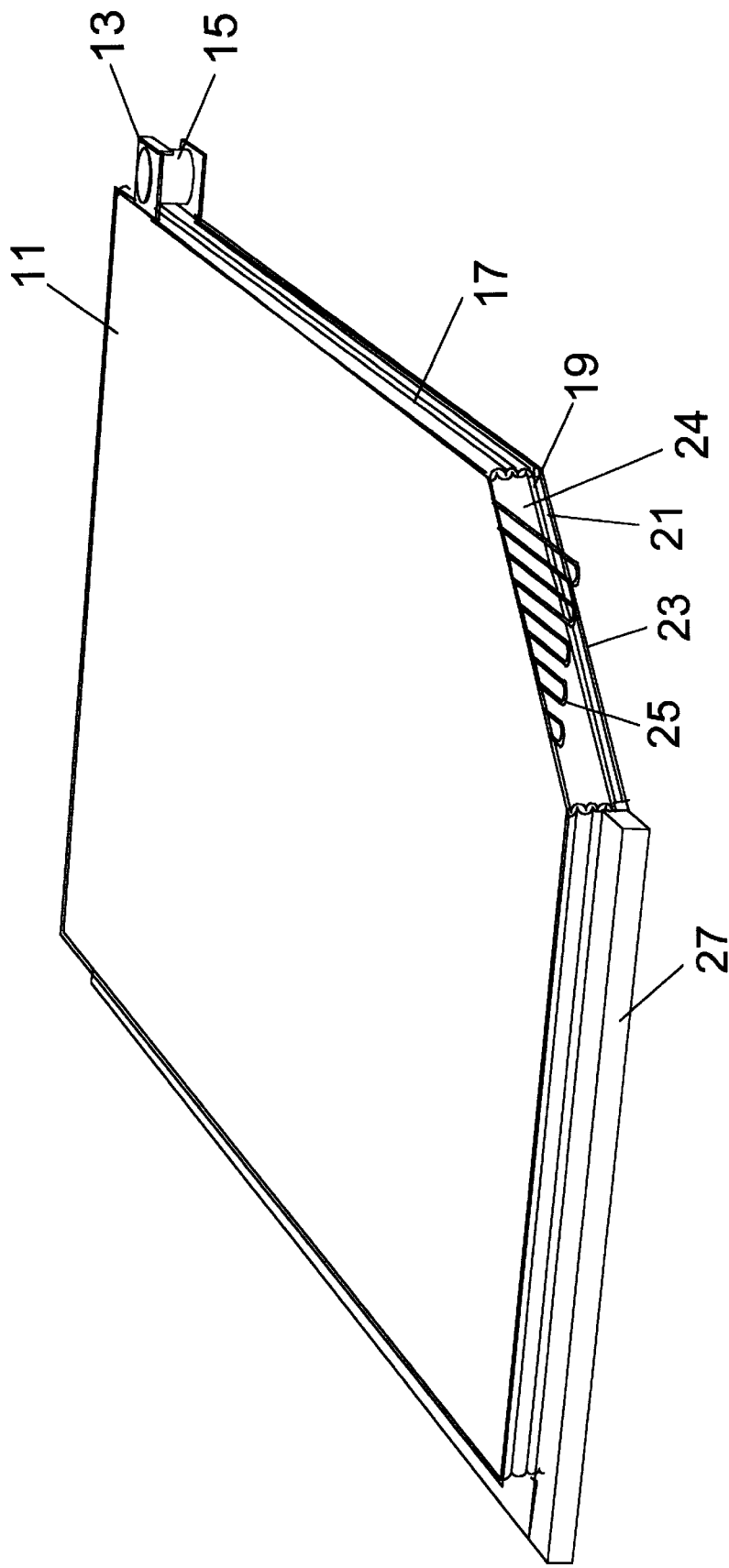

This application is entitled to the benefit of Provisional Patent Application Ser. No. 60/110,487 filed Dec. 1, 1998 and of Provisional Patent Application Ser. No. 60/111,708 filed Dec. 10, 1998.

BACKGROUND FIELD OF INVENTION

This invention relates to windows that are mounted in a building or on a vehicle, specifically to improved design, structure and use of windows.

BACKGROUND-DESCRIPTION OF PRIOR ART

Originally windows were created and manufactured to enable light to enter buildings and to enable those inside to see outside. For centuries the use and construction of windows changed little. Inventors experimented with incorporating different materials resulting in ornamental windows such as stained glass. By late in the twentieth century, advanced windows include many beneficial adaptations. Commonly, multiple panes are used to maximize energy efficiency often with vacuum or with injected gas between the pains. The widow panes incorporate many more substances added during various stages of production. These substances create various beneficial effects such as tinting and to manipulate selected band widths of electromagnetic energy in desirable ways. Most recently windows have incorporated means to adjust between clear and opaque states as desired. This adaptation effectively converges the historic window blind function into the window itself Even with all the advances in window materials and manufacture, the main functions and generally passive role of windows have remained largely unchanged since their original conception and production many centuries ago and subsequent widespread use to this day.

The effect of variable diffraction using fluids was observed in the construction of variable prisms over a century ago. Subsequently, many well documented constructs have employed the variable diffraction effect of fluid prisms and lenses to achieve desirable objectives. Particularly camera lenses, ray stabilizers, laser ray directing devices, and movie projection devices have all widely used the variable diffraction properties of fluid prisms and lenses. Heretofore the concept, design and manufacture of fluid prisms as functioning window panes incorporated into a building or vehicle has not existed. Converging window and fluid prism technologies as herein described provides abundant and valuable benefits heretofore unrecognized and unaddressed in prior art.

SUMMARY

The invention described herein incorporates a variable fluid prism between the panes of a window mounted in a building or on a vehicle. This novel construction enables a user to adjust the view that the window provides from any given single vantage point simply by adjusting the angle contained within the fluid prism. Moreover a second fluid prism is incorporated to reduce dispersion. Also incorporated are temperature regulators, insulators, mounting hardware, and software code to adjust prism angles to minimize diffraction among visible wavelengths.

Objects and Advantages

Accordingly, several objects and advantages of my invention are apparent. The invention increases the functions that a window performs in many circumstances. The invention also improves the aesthetic appeal provided by a window within a building.

Many people can not autonomously adjust their position to see the full hemisphere possible on the outside of a window. By making the window itself adjustable as herein described, the user can select which portion of the external hemisphere she wishes to view from nearly any single vantage point inside a structure. Moreover as provided herein, the view selected can again be altered whenever desired. Similarly, drivers of a vehicle are somewhat restricted regarding their physical mobility. Particularly, the art includes many examples intended to eliminate blind spots in a vehicle. The art described herein enables a driver to manipulate the view provided by the window glass thereby eliminating blind spots without mirrors or reflecting prisms.

The value of each particular window from an aesthetic standpoint is related to the beauty of the view it provides. Heretofore, the view provided by a window in a building was limited to whatever view an architect had the foresight to plan into construction or was later altered externally. Some windows had excellent views and some windows had poor views. The view from any given vantage point within the building was virtually unalterable. As described herein, the present invention enables the view from a single vantage point through a single window to be infinitely altered in nearly a 180 degree hemisphere. Moreover different views can be selected nearly instantly and changed anytime desired. Thus a user can view a sunrise in the east and later a sunset in the west without ever altering their own perspective. Also, a window high up a wall that historically only provided a view of the sky can be adjusted as described herein to provide views of the ground beneath it in any direction. All of these examples include greatly enhanced aesthetic appeal.

Similarly, the practicality of the view that a given window provides has heretofore been unalterable. The addition of mirrors to the external walls of a building or the sides of a vehicle have been used to enable the user to view different directions from a given vantage point. Alternately, cameras and monitors have been used to provide views. This invention uses fluid diffraction within the window to achieve alternate views. If the user wants to view the side walk or drive way outside of the building for example, she can adjust the window diffraction instead of adjusting her vantage point or relying on other technology. If the driver of a vehicle wants to view the blind spot beside her vehicle, she can adjust the side window of her car to provide the view very comfortably through fluid diffraction within the window.

Further objects and advantages will become apparent from a consideration of the drawings and ensuing description.

DRAWING FIGURES

FIG. 1 single fluid prism window

Figure 2:
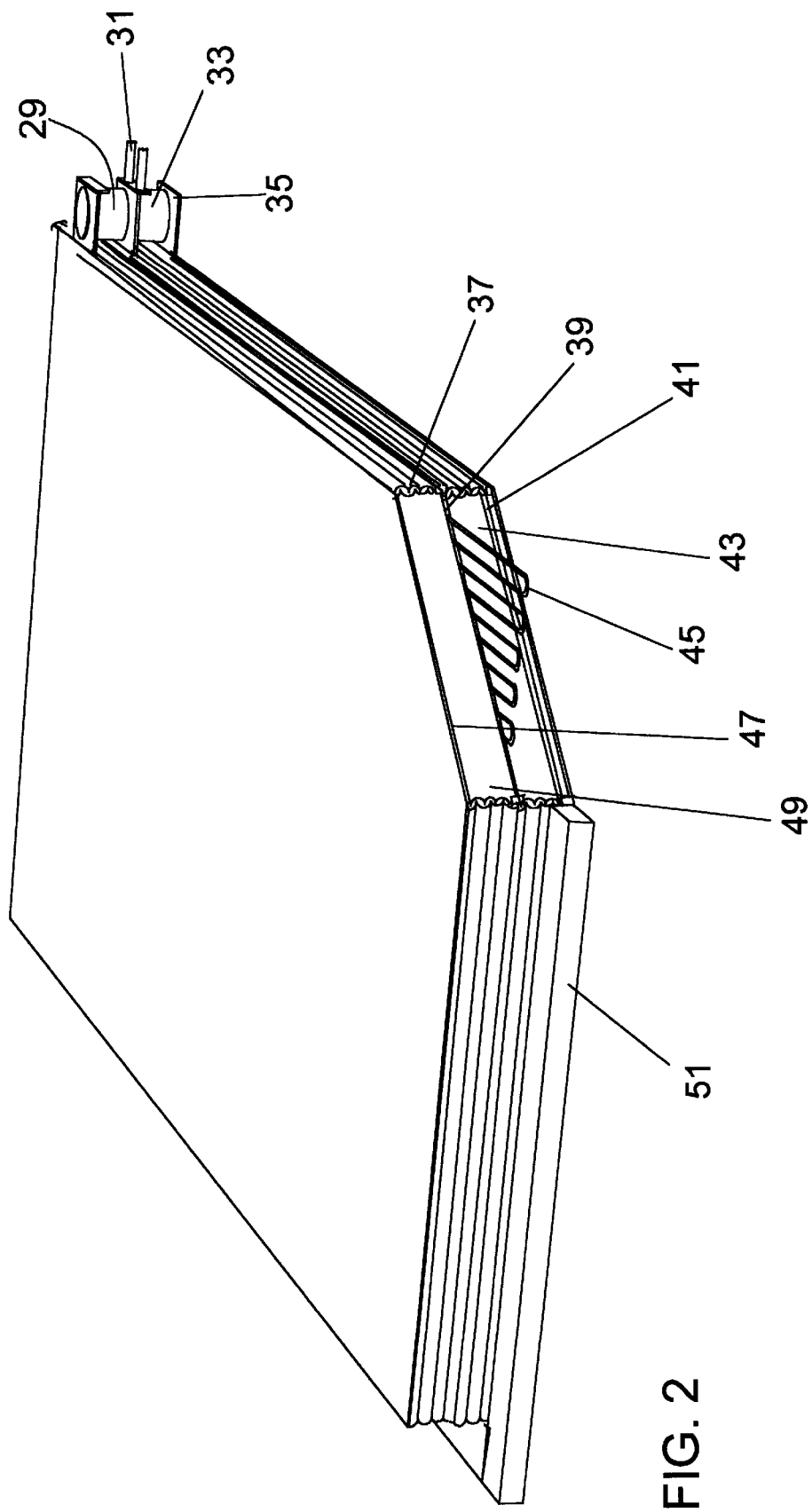

FIG. 2 double fluid prism window

Figure 3:
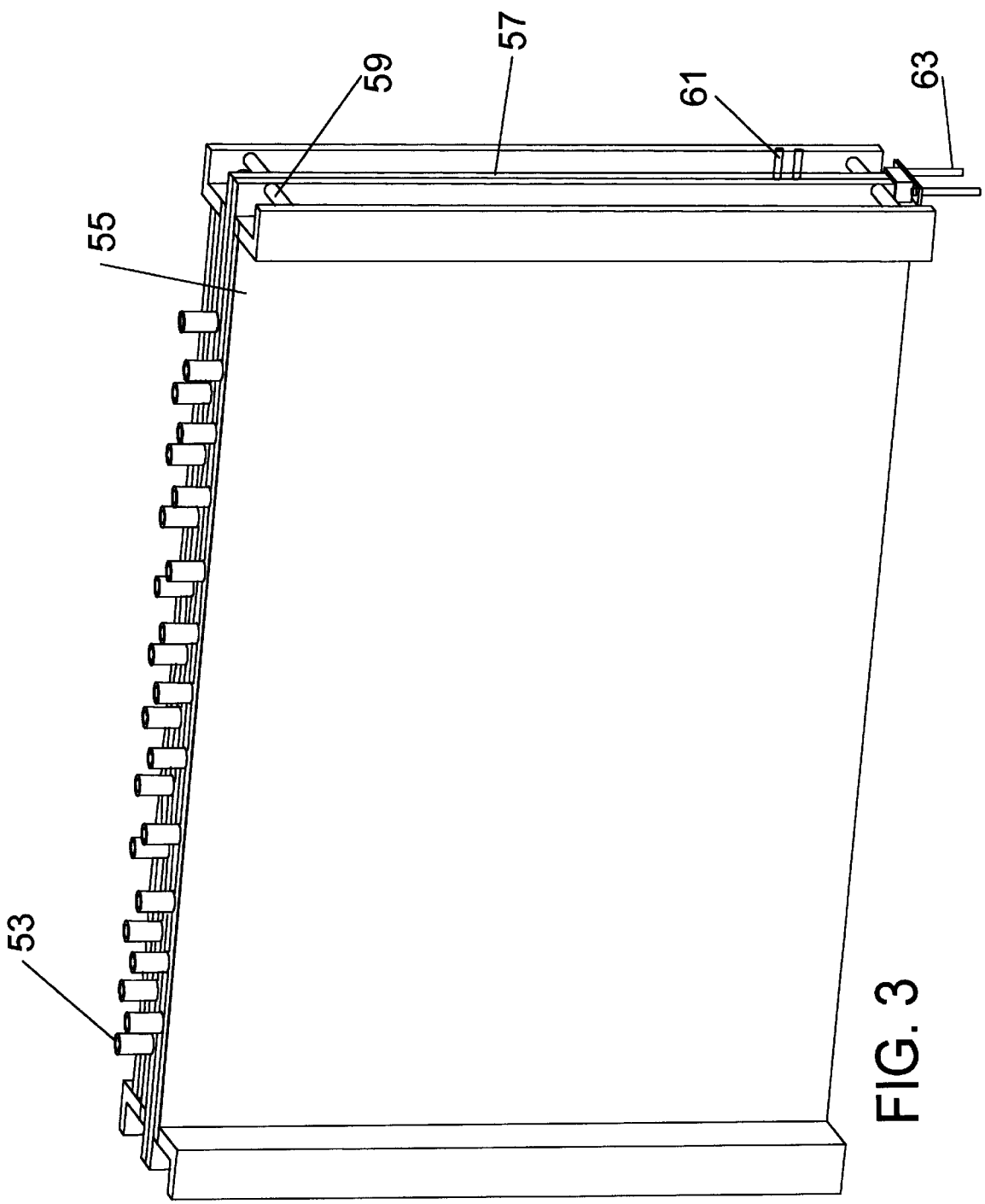
Figure 4:
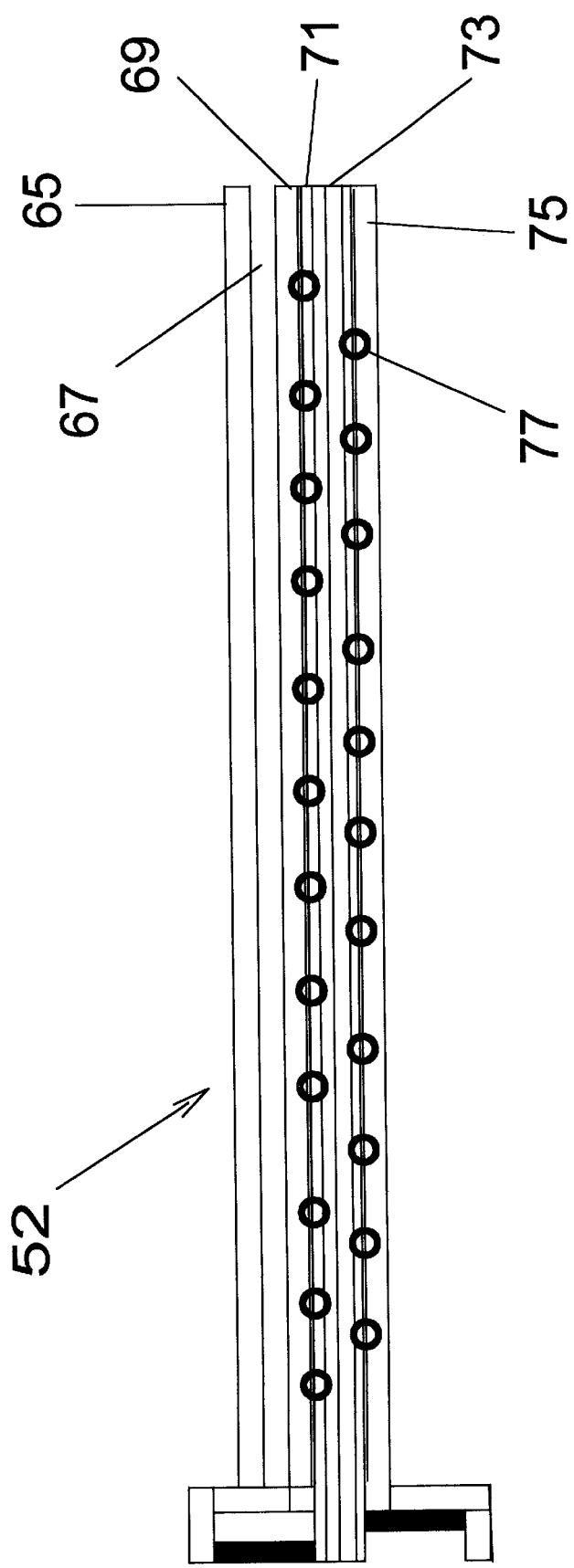
Figure 5:
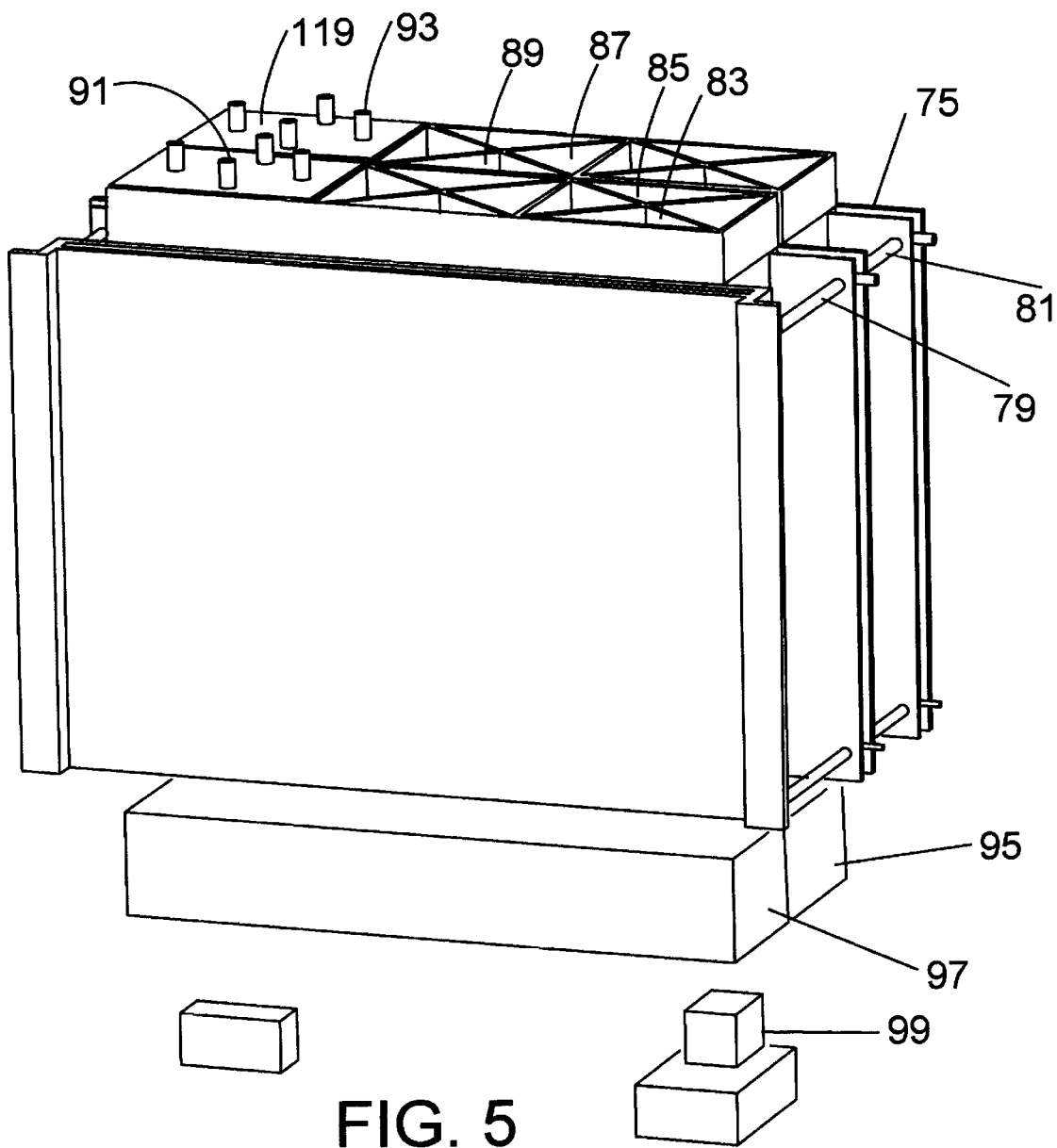
Figure 6:
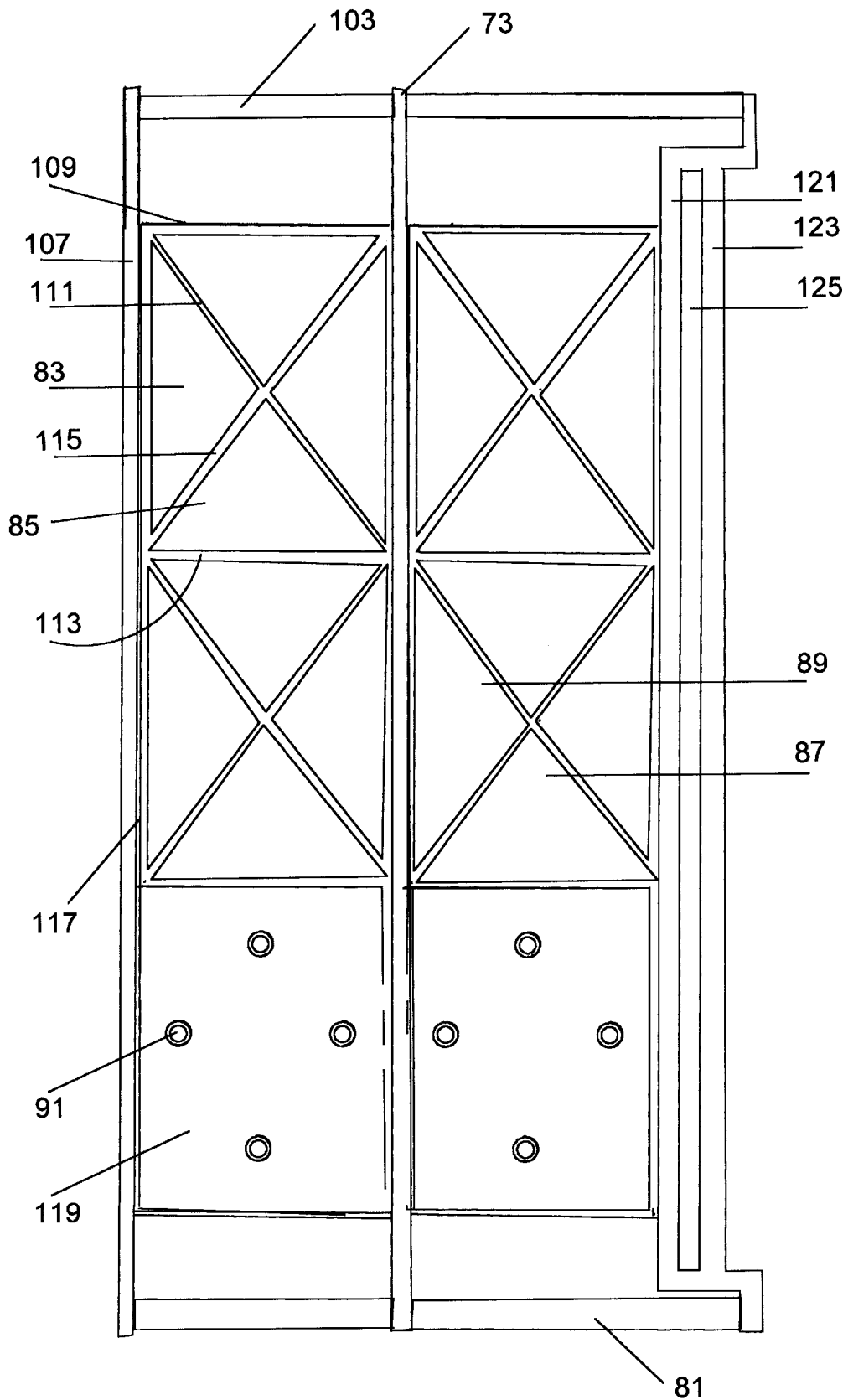
Figure 7:
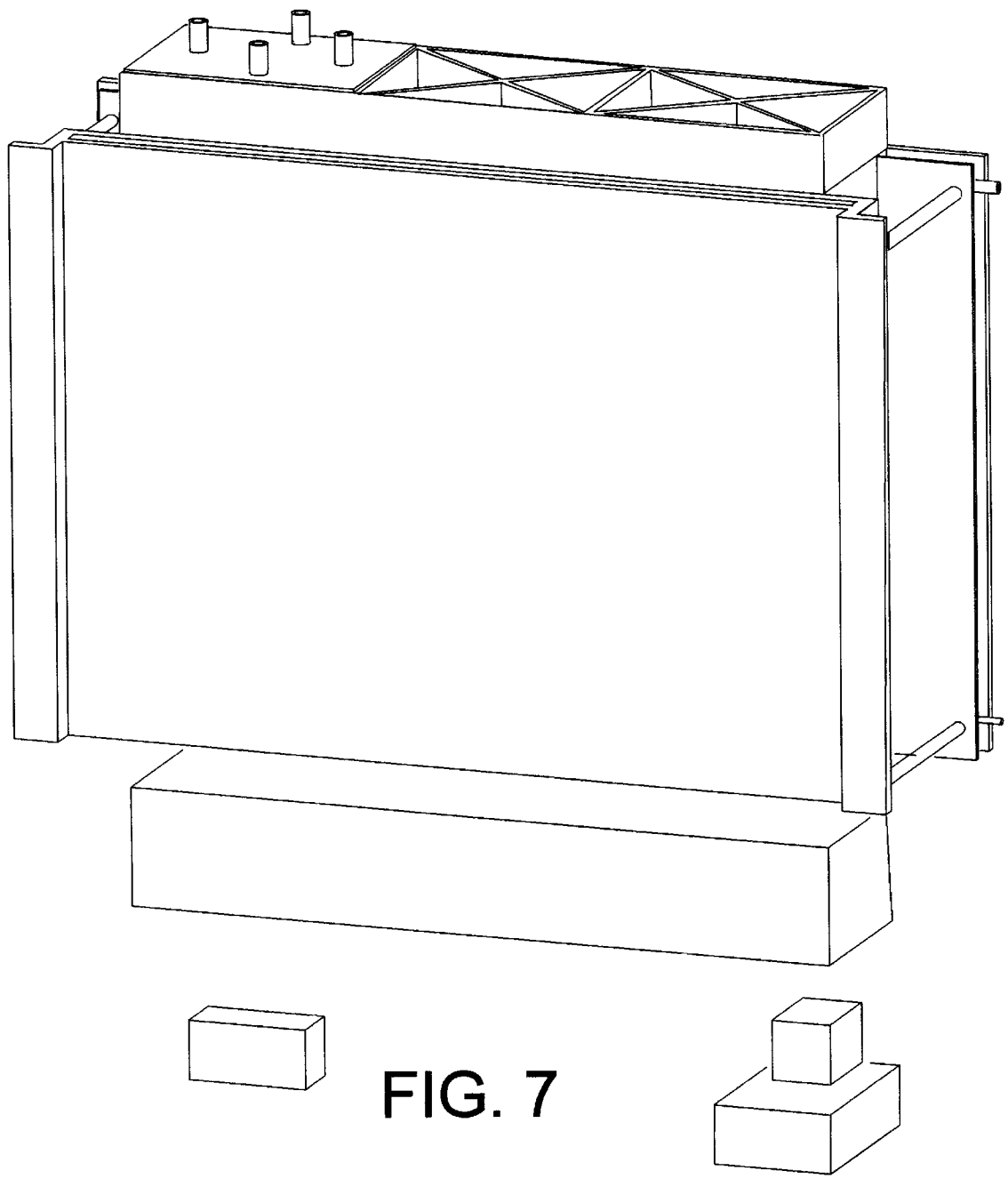

FIG. 3 double fluid columnar window closed
FIG. 4 double fluid columnar window closed, top view
FIG. 5 double fluid columnar window open
FIG. 6 double fluid columnar window open, top view
FIG. 7 single fluid columnar window

REFERENCE NUMERALS IN DRAWINGS 11 interior window pane
13 window mount A
15 cylinder A
17 stretchable seal A
19 middle pane A
21 insulating chamber A
23 exterior pane A
24 refractive fluid A
25 temperature regulator A
27 mounting flange A
29 cylinder B1
31 mounting assembly B
33 cylinder B2
35 window bracket B
37 stretchable seal B
39 median pane B
41 exterior pane B
43 refractive fluid B1
45 temperature regulator B
47 interior pane B
49 refractive fluid B2
51 window trim B
53 fluid port 2
55 interior pane C
57 median pane C
59 cylinder C
61 temperature regulator C
63 mounting assembly C
65 exterior pane C
67 insulating chamber C
69 middle pane C
71 stretch lining
73 median pane C
75 interior pane C
77 fluid port 2
79 cylinder C2
81 cylinder C3
83 fluid column C1
85 fluid column C2
87 fluid column C3
88 fluid column C4
89 fluid column C5
91 fluid port 3
93 fluid port 4
95 fluid reservoir 1
97 fluid reservoir 2
99 Fluid pump
101 median pane C
103 cylinder C4
105 cylinder flange
107 interior pane C
109 vertical stretch wall 1
111 diagonal stretch wall 1
113 vertical stretch wall 2
115 diagonal stretch wall 2
117 pane adhesive
119 stretch lid
121 middle pane C
123 exterior pane C
125 insulating chamber C

DESCRIPTION—FIGS. 1 AND 2—ALTERNATE EMBODIMENTS

A first embodiment of the variable view window is illustrated in FIGS. 1 and 2.

FIG. 1 shows the components that form a single fluid prism window. A 11 interior window pane is a rigid material through which some spectrums of electromagnetic radiation pass. It forms one side of the single fluid prism window. Attached to the 11 interior pane are four mounts, 13 window mount A is one such mount. The 13 window mount A forms a rigid connection between the 11 interior window pane and a 15 cylinder A. The 15 cylinder A is similarly fastened to a 19 middle pane A by a mount. The 19 middle pane A is a rigid material through which some spectrums of electromagnetic radiation passes. A 17 stretchable seal A sealably connects the 11 interior window pane to the 19 middle pane A such that a water tight compartment is formed between these panes. The 17 stretchable seal is a stretchable or flexible manufacture. It is often manufactured from materials including rubber or petroleum feed stocks. Filling the compartment between the 11 interior pane and the 19 middle pane A is a 24 refractive fluid A. The 24 refractive fluid A is a fluid with a refractive index (Table V includes a fraction of the fluids that have refractive indices). (Note that the term "fluid" as used throughout this document refers to any substance that is alterable with the shape of its container or tends to take the shape of its container.) A 21 insulating chamber A is formed between the 19 middle pane A and a 23 exterior pane A which are seal ably connected to one another at their edges. The 21 insulating chamber A may be filled with a vacuum or other means of transparent insulation. A 25 temperature regulator A coil is comprised from a barely visible material through which electricity flows. The 25 temperature regulator A communicates with the 24 refractive fluid A. A 27 mounting flange is rigidly connected to the 23 exterior pane A and the 19 middle pane such that the assembly can be securably mounted to a structure.

FIG. 2 shows the components of a double fluid prism window. A 29 cylinder B1 connects a 47 interior pane to a 39 median pane B. Also connected to the 39 median pane and 29 cylinder B1 assembly is a 31 mounting assembly B1. A 33 cylinder B2 connects the 39 median pane B to a 41 exterior pane B. The 39 median pane B, 41 exterior pane B, and 47 interior pane B are each formed by rigid materials through which some spectrums of electromagnetic radiation pass. Sealably around the edges of all of these panes and forming two water tight chambers between the three panes is a 37 stretchable seal B. The 37 stretchable seal B can bend and stretch such that panes can move relative to each other. It is often manufactured from materials including rubber or petroleum feed stocks. A 43 refractive fluid B1 is contained in the chamber between the 41 exterior pane B and the 39 median pane B. The refractive fluid B1 is a fluid with a refractive index through which some wavelengths of electromagnetic energy passes. A 45 temperature regulator B is housed within the 39 median pane B. The 45 temperature regulator B is barely visible and conducts electricity. A 49 refractive fluid B2 is contained between the 47 interior pane B and the 39 median pane B. The 49 refractive fluid B2 is a fluid with a refractive index through which visible light passes. A 51 window trim B goes around the other components. The 51 window trim B is rigidly attached at the edges of the outermost panes, it protects the assembly and adds aesthetic value when installed.

prism window and control color separation. Using Snell's Law, it can determine the relative wavelength trajectory differences in any refractory material that cause the color separation. The LOSLO software reveals that an ethyl alcohol (solutions in) prism angle range of −0.216 radians through 0.216 radians can be achieved while maintaining a tolerance of 0.001 radians refracted trajectory difference between the two visible wavelengths listed I Table V. Table I discloses the result when considering three incident angles simultaneously.

TABLE I

Ethyl Alcohol (solutions in) maximum prism angle while maintaining relative trajectory tolerance of .001 radians across three incident (all angles are in radians).

| Incident Angle | Prism Angle | Trajectory of 1st wavelength | Trajectory of 2nd wavelength | Relative Trajectory Angle |
|---|---|---|---|---|
| 0.52 | 0.216 | 0.430740593273115 | 0.431739667349834 | −0.000999074076718731 |
| 0.32 | 0.216 | 0.238811836432108 | 0.23974608306997 | −0.000934246637862124 |
| 0.02 | 0.216 | −0.0602629892363292 | −0.0593184626870569 | −0.000944526549272233 |

Operation of the Invention in Alternate Embodiments

The components of FIG. 1 combine to form a single fluid prism window. As the 15 cylinder A is caused to expand, it pushes one edge of the 11 interior window pane away from the 19 middle pane. This movement causes the two panes to reside in relatively non-parallel planes. Thus the 24 refractive fluid A forms a prism causing refraction of visible light passing there through. Using multiple cylinders similar to the 15 cylinder A but attached in the other three corners of the panes enables the panes to be moved into many different planes. Cylinders depicted in the drawing are controlled by hydraulic pressure through a remote pump and control mechanism which are well known in the art and therefore not shown. Such movement causes the 24 refractive fluid to form virtually any desired angle less than 90 degrees. Using a fluid with a high refractive index such as methylnapththalene will create a high refraction thus requiring less cylinder extension to achieve high light refraction. Table V lists a fraction of the many possible refractive fluids.) Unfortunately in many refractive fluids, high diffraction across the visible light spectrum will be concomitant with the high light refraction achieved. This causes the user's view to be distorted by color separation. In the FIG. 1 embodiment, the solution to the diffraction and resultant color separation problem is to use a refractive fluid with a low diffraction in the visible spectrum. (Table V discloses the refractive properties of some materials these are a fraction of the refractive fluids that can be utilized). The last column "Ratio" describes the amount of diffraction a given material has as a function of the wavelength range described range. The higher the "Ratio", the lower the diffraction. Ethyl alcohol (solutions in) for example has a relatively low diffraction with a "Ratio" of −0.024941. Using this fluid will lessen the color separation problem.

The color separation problem posed by diffraction can be easily explored using the "LOSLO" software included herein. This software was developed to operate the fluid Note that the ray with the initial incident angle of 0.52 has a final trajectory of approximately 0.43. The difference between these angles is 0.09. 0.09 represents the total refraction achieved by the two fluids will cause color separation exceeding the 0.001 relative trajectory level. The user will see color distortion with any relative trajectory difference depending upon their distance from the refracting window. The goal then is to minimize any difference in relative trajectory across the visible spectrum.

FIG. 2 depicts the double fluid prism window. This embodiment presents an alternate solution to the color separation caused by diffraction discussed above. Mounting the assembly with the 31 mounting B and similar mounting hardware on the other corners causes the 39 median pane B to be in a permanently fixed position. Cylinders depicted in the drawing are controlled by hydraulic pressure through a remote pump and control mechanism which are well known in the art and therefore not shown. Expanding and contracting the 29 cylinder B1 (and similar cylinders located at other corners) will cause the 47 interior pane B to move to different planes relative to the 39 median pane B. This causes the 49 refractive fluid B2 to form many different prism angles as desired. Similarly, expanding and contracting cylinders such as 33 cylinder B2 will cause the 41 exterior pane to move to planes non-parallel to the 39 median plane B. Thus forming many possible prism angles with 43 refractive fluid B1. The 37 stretchable seal B enables these panes to move relative to each other while still containing their respective refractive fluids. The 45 temperature regulator keeps the fluid at a desired temperature which is desirable since the refractive index of a material generally varies with temperature.

In operation, the double fluid prism window is designed such that one fluid prism does most of the refraction and the other fluid prism neutralizes the diffraction caused by the first prism. The "LOSLO" a software is designed to operate these two fluid prisms such that color distortion caused by diffraction is minimized.

TABLE II using water as the first refractive fluid and methylnapthalene as the second refractive fluid, the maximum refraction achievable while maintaining relative trajectory tolerance of .0001 radians across three incident angles (all angles are in radians).

| Incident Angle | 1st Prism Angle | 2nd Prism Angle | Trajectory of 1st wavelength | Trajectory of 2nd wavelength | Relative Trajectory Angle |
|---|---|---|---|---|---|
| 0.52 | 0.396 | −0.053 | 0.39837 | 0.39847 | −9.7618E-5 |
| 0.32 | 0.396 | −0.053 | 0.20724 | 0.20725 | −1.7305E-5 |
| 0.02 | 0.396 | −0.053 | −0.09519 | −0.09528 | 9.2163E-5 |

Note that the ray with the initial incident angle of 0.52 has a final trajectory of approximately 0.40. The difference between these angles of 0.12 radians represents the total refraction achieved on the two fluids' trajectories. The FIG. 2 embodiment with water and methylnapthalene achieved a 30% (from 0.9 to 0.12) greater refraction than was achieved with the FIG. 1 single fluid prism window with a concomitant 1000% decrease in the diffraction (from 0.001 to 0.0001).

Another example of how the FIG. 2 double fluid prism window can use two fluids together to achieve high refraction and low diffraction is described in Table III.

TABLE III using octane as the first refractive fluid and pentane as the second refractive fluid, the maximum refraction achievable while maintaining relative trajectory tolerance of .0005 radians across three incident angles (all angles are in radians).

| Incident Angle | 1st Prism Angle | 2nd Prism Angle | Trajectory of 1st wavelength | Trajectory of 2nd wavelength | Relative Trajectory Angle |
|---|---|---|---|---|---|
| 0.52 | 0.014 | −0.431 | 0.992050137205817 | 0.991598815447285 | 0.000451321758532908 |
| 0.17 | 0.014 | −0.431 | 0.386821210548222 | 0.387130340908125 | −0.000309130359902765 |
| 0.02 | 0.014 | −0.431 | 0.211241377302523 | 0.211665137702471 | −0.000423760399948264 |

Note that the ray with the initial incident angle of 0.52 has a final trajectory of approximately 0.99. The difference between these of 0.47 represents the total refraction achieved on the two fluids' trajectories. Thus the FIG. 2 embodiment with octane and pentane can bend a normal (90 degree) light ray up to 0.47 radians in any direction from the normal to the incident surface.

A second problem posed by both the FIG. 1 and FIG. 2 embodiments is the range of movement that the panes must under go relative to one another in order to achieve high levels of refraction. Assume for example that the 47 interior pane was a four foot square window. In the Table III example, the 2nd prism angle of 0.431 would require that one edge of the window move out from the wall (into the room) about 1.5 feet. Having the window panes undergo movement of this magnitude is often not desirable. It can be aesthetically distracting to look at or it can be bumped into, also very impractical as with automobile windows for example. Larger window sizes with greater movement would often not be practicable using the FIG. 1 and FIG. 2 embodiments.

FIGS. 3 through 7—Preferred Embodiments

FIG. 3 shows the components that form double fluid columnar window. The window is show in the fully collapsed position.

A 59 cylinder C is in the fully collapsed position as are. Cylinders depicted in the drawing are controlled by hydraulic pressure through a remote pump and control mechanism which are well known in the art and therefore not shown. The 59 cylinder C connects to A57 median pane C. A53 fluid port 2 is the means by which fluid enters into one column of the assembly. The 53 fluid port 2 communicates with a chamber housed between two glass panes. A55 interior pane C forms one side of the window assembly. A61 temperature regulator C extrudes beyond the 57 median pane C in which it resides. A 63 mounting assembly connects the corner of the 57 median pane C to a structure with protruding bolts.

FIG. 4 shows the top view of the embodiment depicted in FIG. 3. The components form a double fluid A 65 exterior pane C forms the outermost surface of the window assembly. Its edges are sealably connected to the 69 middle pane C. A 67 insulating chamber C is formed between these two panes, it may contain a vacuum or other transparent insulating material. A 73 median pane C resides in close proximity to the 69 middle pane C yet between the panes is housed a 71 stretch lining. The lining is a highly elastic material that forms the prismatic surfaces which contain liquids. A 75 interior pane C forms one side of the window assembly. It also resides close to the 73 median pane C. A 77 fluid port 2 communicates fluid to one of the columns residing between the 75 interior pane C and the 73 median pane C of the assembly.

FIG. 5 shows the embodiment depicted in FIGS. 3 and 4 except in the open position. The components form a double fluid columnar window.

A 79 cylinder C2 connects the 73 median pane C to the 69 middle pane C. It is show in the expanded position pushing the two panes apart. A 81 cylinder C3 connects the 73 median pane C to the 75 interior pane C. It is shown in the expanded position pushing the two pane apart. A 83 fluid column C1 has been opened wide by the separation of the 73 median pane C and the 69 middle pane C. For illustration, the top of the 83 fluid column C1 has been removed. It comprises a three dimensional triangular chamber that is bounded by highly elastic material such as rubber. It is filled with air. Similarly, the 85 fluid column C2 has been opened and is illustrated with top removed. This column is depicted containing a fluid other air and it one component of the total prismatic effective of one side of this window. Similarly a 87 fluid column C3 and a 89 fluid column C5 have been opened by the movement of the 75 interior pane C away from the 73 median pane C. These two columns contain the second refractive fluid. A 91 fluid port 3 and a 93 fluid port 4 are two of the many ports each one communicating with one fluid column. A 95 fluid reservoir 1 contains refractive fluid to e pumped to and from one side of the assembly and a 97 fluid reservoir 2 contains refractive fluid to be pumped to and from the other side of the assembly. A 99 fluid pump is used to convey fluids to and from the assemblies columns and its cylinders.

FIG. 6 shows the top view of the embodiment depicted in FIGS. 3, 4, and 5. The components form a double fluid columnar window.

A 103 cylinder C4 connects 73 median pane C to a 107 internal pane C. For illustrative purposes, the tops have been removed from these columns. A 109 vertical stretch wall forms the side of a fluid column. A 111 diagonal stretch wall 1 forms half of an "X" shape with the 115 diagonal stretch wall forming the other half of the "X". Together they with their closest two vertical stretch walls, describe four separate columns including 83 fluid column C1 and 85 fluid column C2. Each of these columns can be filled with fluid or air as desired. A 117 pane adhesive connects the stretch lining material to the 75 interior pane C. A 119 stretch lid covers a series of columns. Normally all columns would be covered by such lids. A 121 middle pane C provides the rigid support for one side of prism columns. It is sealably connected to 123 exterior pane C such that a 125 insulating chamber C is formed.

FIG. 7 illustrates a single fluid columnar window. It has all of the elements described in FIGS. 3 through 6 with the exception that is basically cut in half and uses only one refractive fluid with air.

Operation—Preferred Embodiments FIGS. 3 through 7

FIG. 3 depicts the double liquid columnar window in the closed position. In this position, all prismatic surfaces are parallel to one another and now net refraction is taking place. It is therefore providing the view of a normal window. The cylinders including 59 cylinder C are fully contracted. All of these cylinders are controlled by pressure provided by a pump these elements are well known in the art and are therefore not shown. 63 mounting assembly C is used to mount the assembly onto a structure, similar such hardware is located on the other 3 corners (not shown) of the 57 median pane. This provides a secure mounting to a structure such as a wall while still allowing free movement of required components. FIG. 4 is a top view of the embodiment of FIG. 3. The 65 exterior pane C contains a ultraviolet filtering material to prevent these rays from effecting the 71 stretch lining. The 65 exterior pane C is sealably fastened to the 69 middle pane C forming a 67 insulating chamber C. The insulating chamber provides a temperature control which is important since the refractory properties of materials vary with temperature. The temperature maintained at higher than room temperature such as 30 degrees C. because it is easier to only have to heat components than it is to cool components.

As depicted in FIG. 5, extending one set of cylinders pushes including 79 cylinder C2 pushes the 69 middle pane C away from the 73 median pane C. This causes a set of fluid columns between these two panes to fill with fluid. All of these fluid columns are normally covered with a 119 stretch lid, lids have been removed in the drawing for illustrative purposes. Half of the columns are filled with air such as 83 fluid column C1 while the other half are filled with a refractive fluid such as 85 fluid column C2. Filling one group of these columns on one side of the 73 median pane C will cause the window to refract light in one direction. Filling the other set of the columns on the same side of 73 median pane C will cause the light to refract in the other direction. The columns closest to the exterior and interior panes only receive air as a fluid while columns closest to the median pane only receive the refractive fluid when filled. Fluid is pumped into each column through its own respective port 91 fluid port 3 is one such port. The fluid is pumped from fluid reservoirs 95 and 97, one for each refractive substance. The 99 fluid pump is used for this function.

Similarly, the cylinders between the 73 median pane C and the 75 interior pane C such as 81 cylinder C3 are used to move these two panes apart. As the panes move apart, fluid is pumped into the each of the fluid columns. Some of the columns are filled with air and some are filled with a refractive fluid according to the direction of the refraction desired. In practice, the diffraction caused by one side of the assembly is offset by the other side of the assembly. This yields the desired amount of refraction within a reduced amount of diffraction.

FIG. 6 further illustrates the double liquid columnar window in the open position. Note that when expanded, 89 fluid column C5 will always be filled with a refractive fluid while 83 fluid column C1 will always be filled with air 87 fluid column C3 will sometimes be filled with air to refract in one direction but at other times be filled with a refractive fluid to refract in the opposite direction. The prism angles change as each pane is moved relative to the median pane with angles from 0 to 4 degrees easily possible. Meanwhile the prisms on one side of the median pane do most of the refraction while the prisms on the opposite of the median pane neutralize most of the diffraction.

109, 111, and 115 all are a stretchable material through which light passes. Transparent latex can be used for this purpose but refractive fluids must be selected carefully such that they do not react with the latex, also the light spectrum passing through the system should be restricted to protect the latex. Fluids such as water and ethyl alcohol will only slowly degrade latex. Table IV illustrates the maximum diffraction achievable with ethyl alcohol (solutions in) as one refractive fluid and water as the second refractive fluid.

TABLE IV using ethyl alcohol (solutions in) as the first refractive fluid and water as the second refractive fluid, the maximum refraction achievable while maintaining relative trajectory tolerance of .001 radians across three incident angles (all angles are in radians).

| Incident Angle | 1st Prism Angle | 2nd Prism Angle | Trajectory of 1st wavelength | Trajectory of 2nd wavelength | Relative Trajectory Angle |
| --- | --- | --- | --- | --- | --- |
| 0.52 | 0.33 | −0.77 | 1.03761533671252 | 1.0384533945893 | −0.000838057876778597 |
| 0.32 | 0.33 | −0.77 | 0.586406225916517 | 0.587080939555663 | −0.000674713639146507 |
| 0.02 | 0.33 | −0.77 | 0.21036029125388 | 0.211336999892587 | −0.000976708638706691 |

The LOSLO computer software calculates what the second prism angle must be to offset the diffraction caused by the first prism's angle. The software code developed to achieve this is provided herein as Table VI. Thus the angles can be adjusted instantly through the actuating cylinders. Note that the range of normal ray movement possible with these two fluids 1.02 rads.

Advantages

Many advantages of the preferred embodiment are present because the user can see man different views achievable. A range greater than 1.5 radians is possible for a normal ray. Secondly, diffraction can be reduced to a low tolerance level of 0.0001 radians across the visible spectrum. Thirdly, the amount of physical movement to adjust prism angles has been significantly reduced. With miniaturization, movement of less than 1 inch to achieve 1.5 radians of normal ray range is easily possible. Fourthly, this structure is compatible with automobile characteristics. Fifthly, for novelty, the window can be adjusted to alter the color separation caused by diffraction. For example, the user can maximize color separation to provide a uniquely distorted view of outside.

CONCLUSION, RAMIFICATIONS, AND SCOPE

Thus the reader will see that the variable view window of this invention provides a highly functional and reliable means to alter the view provided through a window from any given vantage point. This is useful from aesthetic and functional perspectives.

While my above description describes many specifications, these should not be construed as limitations on the scope of the invention, but rather as an exemplification of one preferred embodiment thereof. Many other variations are possible. For example prism angles can be actuated by any schemes other than pressure. Window panes referred to herein can be manufactured with many materials, many fluids with refractive indices not included herewith can be used, flexible materials must be matched to fluids such that they don't interact with one another.

Accordingly, the scope of the invention should be determined not by the embodiment(s) illustrated, but by the appended claims and their legal equivalents.

TABLE V

Following are the refractive indices of a fraction of the liquids which can function within a liquid prism, as compiled from referenced sources.

| Reference | Temp in K | Material | Wavelength | Ref Index | wv spread | n spread | ratio | weighted ratio |
|---|---|---|---|---|---|---|---|---|
| Nikogosyan | 288.15 | H2O | 0.40466 | 1.34316 | | | | |
| Nikogosyan | 288.15 | H2O | 0.43584 | 1.34062 | | | | |
| Nikogosyan | 288.15 | H2O | 0.4471 | 1.33983 | | | | |
| Nikogosyan | 288.15 | H2O | 0.4713 | 1.33834 | | | | |
| Nikogosyan | 288.15 | H2O | 0.48613 | 1.33753 | | | | |
| Nikogosyan | 288.15 | H2O | 0.5016 | 1.33676 | | | | |
| Nikogosyan | 288.15 | H2O | 0.54607 | 1.33487 | | | | |
| Nikogosyan | 288.15 | H2O | 0.577 | 1.33378 | | | | |
| Nikogosyan | 288.15 | H2O | 0.58756 | 1.33344 | | | | |
| Nikogosyan | 288.15 | H2O | 0.5893 | 1.33339 | | | | |
| Nikogosyan | 288.15 | H2O | 0.65628 | 1.33155 | | | | |
| Nikogosyan | 288.15 | H2O | 0.6678 | 1.33127 | | | | |
| Nikogosyan | 288.15 | H2O | 0.70652 | 1.33041 | | | | |
| Nikogosyan | 293.15 | H2O | 0.40466 | 1.34274 | | | | |
| Nikogosyan | 293.15 | H2O | 0.43584 | 1.34021 | | | | |
| Nikogosyan | 293.15 | H2O | 0.4471 | 1.33942 | | | | |
| Nikogosyan | 293.15 | H2O | 0.4713 | 1.33793 | | | | |
| Nikogosyan | 293.15 | H2O | 0.48613 | 1.33712 | | | | |
| Nikogosyan | 293.15 | H2O | 0.5016 | 1.33635 | | | | |
| Nikogosyan | 293.15 | H2O | 0.54607 | 1.33447 | | | | |
| Nikogosyan | 293.15 | H2O | 0.577 | 1.33338 | | | | |
| Nikogosyan | 293.15 | H2O | 0.58756 | 1.33304 | | | | |
| Nikogosyan | 293.15 | H2O | 0.5893 | 1.33299 | wv spread | n spread | ratio | weighted ratio |
| Nikogosyan | 293.15 | H2O | 0.65628 | 1.33115 | | | | |
| Nikogosyan | 293.15 | H2O | 0.6678 | 1.33088 | −0.30186 | 0.0127200000 000001 | −0.042138739 8131586 | −31.58328905 66036 |
| Nikogosyan | 293.15 | H2O | 0.70652 | 1.33002 | | | | |
| Nikogosyan | 298.15 | H2O | 0.40466 | 1.34239 | | | | |
| Nikogosyan | 298.15 | H2O | 0.43584 | 1.33971 | | | | |
| Nikogosyan | 298.15 | H2O | 0.4471 | 1.33892 | | | | |
| Nikogosvan | 298.15 | H2O | 0.4713 | 1.33743 | | | | |
| Nikogosyan | 298.15 | H2O | 0.48613 | 1.33663 | | | | |
| Nikogosyan | 298.15 | H2O | 0.5016 | 1.33586 | | | | |
| Nikogosyan | 298.15 | H2O | 0.54607 | 1.33398 | | | | |
| Nikogosyan | 298.15 | H2O | 0.577 | 1.33289 | | | | |
| Nikogosyan | 298.15 | H2O | 0.58756 | 1.33256 | | | | |
| Nikogosyan | 298.15 | H2O | 0.5893 | 1.3325 | | | | |
| Nikogosyan | 298.15 | H2O | 0.65628 | 1.33067 | | | | |
| Nikogosyan | 298.15 | H2O | 0.6678 | 1.3304 | | | | |
| Nikogosyan | 298.15 | H2O | 0.70652 | 1.32954 | | | | |
| Nikogosyan | 303.15 | H2O | 0.40466 | 1.34166 | | | | |
| Nikogosyan | 303.15 | H2O | 0.43584 | 1.33913 | | | | |
| Nikogosyan | 303.15 | H2O | 0.4471 | 1.33835 | | | | |
| Nikogosyan | 303.15 | H2O | 0.4713 | 1.33686 | | | | |
| Nikogosyan | 303.15 | H2O | 0.48613 | 1.33606 | | | | |
| Nikogosyan | 303.15 | H2O | 0.5016 | 1.33529 | | | | |
| Nikogosyan | 303.15 | H2O | 0.54607 | 1.33341 | | | | |

TABLE V-continued

Following are the refractive indices of a fraction of the liquids which can function within a liquid prism, as compiled from referenced sources.

| Reference | Temp in K | Material | Wavelength | Ref Index | | | |
|---|---|---|---|---|---|---|---|
| Nikogosyan | 303.15 | H2O | 0.577 | 1.33233 | | | |
| Nikogosyan | 303.15 | H2O | 0.58756 | 1.33199 | | | |
| Nikogosyan | 303.15 | H2O | 0.5893 | 1.33194 | | | |
| Nikogosyan | 303.15 | H2O | 0.6678 | 1.32984 | | | |
| Nikogosyan | 303.15 | H2O | 0.70652 | 1.32899 | | | |
| Nikogosyan | 288.15 | methanol | 0.48613 | 1.3346 | wv spread | n spread | ratio | weighted ratio |
| Nikogosyan | 288.15 | methanol | 0.65628 | 1.32897 | −0.17015 | 0.00563000000000002 | −0.0330884513664415 | −40.1641643872112 |
| Nikogosyan | 293.15 | ethenol | 0.40466 | 1.3729 | wv spread | n spread | ratio | weighted ratio |
| Nikogosyan | 293.15 | ethenol | 0.65628 | 1.3591 | −0.25162 | 0.01389469837 | −0.05484460633333 | −24.78092333 |
| Nikogosyan | 293.15 | ethylene glycol | 0.43584 | 1.44 | wv spread | n spread | ratio | weighted ratio |
| Nikogosyan | 293.15 | ethylene glycol | 0.65628 | 1.4296 | −0.22044 | 0.01045316638 | −0.04717837084616 | −30.30202153 |
| Nikogosyan | 293.15 | glycerol (glycerine) | 0.48613 | 1.4795 | wv spread | n spread | ratio | weighted ratio |
| Nikogosyan | 293.15 | glycerol (glycerine) | 0.65628 | 1.4721 | −0.17015 | 0.00740000000000007 | −0.0434910373200122 | −33.848353378378 |
| Nikogosyan | 293.15 | hexane | 0.48613 | 1.3795 | wv spread | n spread | ratio | weighted ratio |
| Nikogosyan | 293.15 | hexane | 0.65628 | 1.373 | −0.17015 | 0.00649999999999995 | −0.0382015868351452 | −35.9409153846157 |
| Nikogosyan | 293.15 | cyclohexane | 0.43584 | 1.4335 | wv spread | n spread | ratio | weighted ratio |
| Nikogosyan | 293.15 | cyclohexane | 0.65628 | 1.42405 | −0.22044 | 0.00944999999999996 | −0.0428688078388675 | −33.2187917460319 |
| Nikogosyan | 293.15 | dichloroethane | 0.48613 | 1.45024 | wv spread | n spread | ratio | weighted ratio |
| Nikogosyan | 293.15 | dichloroethane | 0.65628 | 1.44189 | −0.17015 | 0.00835000000000008 | −0.0490743461651489 | −29.3817465269458 |
| Nikogosyan | 293.15 | chloroform | 0.43584 | 1.4546 | wv spread | n spread | ratio | weighted ratio |
| Nikogosyan | 293.15 | chloroform | 0.65628 | 1.443 | −0.22044 | 0.0115999999999998 | −0.0526220286699321 | −27.4219758620694 |
| Nikogosyan | 293.15 | benzene | 0.40466 | 1.5318 | wv spread | n spread | ratio | weighted ratio |
| Nikogosyan | 293.15 | benzene | 0.65628 | 1.49663 | −0.25162 | 0.0351700000000001 | −0.139774262777204 | −10.7074791185669 |
| Nikogosyan | 293.15 | nitrobenzene | 0.48613 | 1.57124 | wv spread | n spread | ratio | wcighted ratio |
| Nikogosyan | 293.15 | nitrobenzene | 0.65628 | 1.54593 | −0.17015 | 0.0253099999999999 | −0.148751101968851 | −10.3927297313315 |
| Nikogosyan | 293.15 | toluene | 0.40466 | 1.52612 | wv spread | n spread | ratio | weighted ratio |
| Nikogosyan | 293.15 | toluene | 0.70652 | 1.489795 | −0.30186 | 0.0363249999999999 | −0.120337242430265 | −12.380165690296 |
| Nikogosyan | 288.15 | carbon tetrachloride | 0.48613 | 1.4697 | wv spread | n spread | ratio | weighted ratio |
| Nikogosyan | 288.15 | carbon tetrachloride | 0.65628 | 1.46005 | −0.17015 | 0.00964999999999994 | −0.0567146635321771 | −25.7437831606219 |
| Nikogosyan | 288.15 | acetone | 0.48613 | 1.36634 | wv spread | n spread | ratio | weighted ratio |
| Nikogosyan | 288.15 | acetone | 0.65628 | 1.35959 | −0.17015 | 0.00675000000000003 | −0.0396708786364974 | −34.2717390370369 |
| Nikogosyan | 288.15 | acetic acid | 0.48613 | 1.37851 | wv spread | n spread | ratio | weighted ratio |
| Nikogosyan | 288.15 | acetic acid | 0.65628 | 1.37165 | −0.17015 | 0.00685999999999987 | −0.0403173670290912 | −34.0213188775517 |
| Nikogosyan | 293.15 | dioxane | 0.43584 | 1.4293 | wv spread | n spread | ratio | weighted ratio |
| Nikogosyan | 293.15 | dioxane | 0.65628 | 1.4202 | −0.22044 | 0.00910000000000011 | −0.0412810742152065 | −34.4031745054941 |
| Nikogosyan | 293.15 | carbon disulfide | 0.40466 | 1.6934 | wv spread | n spread | ratio | weighted ratio |
| Nikogosyan | 293.15 | carbon disulfide | 0.65628 | 1.6182 | −0.25162 | 0.0751999999999999 | −0.298863365392258 | −5.41451441489362 |
| Marsh | 293 | silicone oil | 0.43584 | 1.53751 | wv spread | n spread | ratio | weighted ratio |
| Marsh | 293 | silicone oil | 0.6678 | 1.51279 | −0.23196 | 0.0247199999999999 | −0.106570098292809 | −14.1952576213593 |
| Marsh | 293 | trimethylpentane | 0.43583 | 1.40029 | wv spread | n spread | ratio | weighted ratio |
| Marsh | 293 | trimethylpentane | 0.66781 | 1.38916 | −0.23198 | 0.0111300000000001 | −0.0479782739891374 | −28.953938616352 |
| Marsh | 293 | hexadecane | 0.43583 | 1.44419 | wv spread | n spread | ratio | weighted ratio |
| | | | | | | 000001 | 7590314 | 31685 |
| Marsh | 293 | trans-bicyclodecane | 0.43583 | 1.48011 | wv spread | n spread | ratio | weighted ratio |
| Marsh | 293 | trans-bicyclodecane | 0.66781 | 1.46654 | −0.23198 | 0.0135700000000001 | −0.0584964221053543 | −25.0705931613853 |
| Marsh | 293 | methynaphthalene | 0.48613 | 1.63958 | wv spread | n spread | ratio | weighted rafio |
| Marsh | 293 | methynaphthalene | 0.66781 | 1.60828 | −0.18168 | 0.0313000000000001 | 0.172280933509468 | −9.33521758466451 |
| Marsh | 293 | methylcyclohexane | 0.43583 | 1.43269 | wv spread | n spread | ratio | weighted ratio |
| Marsh | 293 | methylcyclohexane | 0.66781 | 1.42064 | −0.23198 | 0.0120500000000001 | −0.0519441331149242 | −27.3493831701242 |
| Gray, D.E. | 293 | Acetaldehyde | 0.486 | 1.3359 | | | | weighted ratio |
| Gray, D.E. | 293 | Acetaldehyde | 0.589 | 1.3316 | wv spread | nspread | ratio | |
| Gray, D.E. | 293 | Acetaldehyde | 0.656 | 1.3298 | −0.17 | 0.00609999999999999 | −0.0358823529411764 | −37.06 |

TABLE V-continued

Following are the refractive indices of a fraction of the liquids which can function within a liquid prism, as compiled from referenced sources.

| Reference | Temp in K Material | Wavelength | Ref Index | | | | |
|---|---|---|---|---|---|---|---|
| Gray, D.E. | 293 acetone | 0.486 | 1.3639 | | | | weighted ratio |
| Gray, D.E. | 293 acetone | 0.589 | 1.3593 | wv spread | nspread | ratio | |
| Gray, D.E. | 293 acetone | 0.656 | 1.3573 | −0.17 | 0.0065999999 9999994 | −0.038823529 4117643 | −34.96075757 57579 |
| Gray, D.E. | 293 aniline | 0.486 | 1.6041 | | | | weighted ratio |
| Gray, D.E. | 293 aniline | 0.589 | 1.5863 | wv spread | nspread | ratio | |
| Gray, D.E. | 293 aniline | 0.656 | 1.5793 | −0.17 | 0.0248000000 000002 | −0.145882352 941177 | −10.82584677 41935 |
| Gray, D.E. | 293 methyl alcohol | 0.486 | 1.3331 | | | | weighted ratio |
| Gray, D.E. | 293 methyl alcohol | 0.589 | 1.5863 | wv spread | nspread | ratio | |
| Gray, D.E. | 293 methyl alcohol | 0.656 | 1.3277 | −0.17 | 0.0053999999 9999985 | −0.031764705 8823521 | 41.79796296 29641 |
| Gray, D.E. | 273 ethyl alcohol | 0.486 | 1.3739 | | | | weighted ratio |
| Gray, D.E. | 273 ethyl alcohol | 0.589 | 1.3695 | wv spread | nspread | ratio | |
| Gray, D.E. | 273 ethyl alcohol | 0.656 | 1.3677 | −0.17 | 0.0061999999 9999998 | −0.036470588 235294 | −37.50145161 29033 |
| Gray D.E. | 293 ethyl alcohol | 0.486 | 1.3666 | | | | weighted ratio |
| Gray D.E. | 293 ethyl alcohol | 0.589 | 1.3618 | wv spread | nspread | ratio | |
| Gray D.E. | 293 ethyl alcohol | 0.656 | 1.3605 | −0.17 | 0.0060999999 9999999 | −0.035882352 9411764 | −37.91557377 04918 |
| Gray, D.E. | 293 n-propyl alcohol | 0.486 | 1.3901 | | | | weighted ratio |
| Gray, D E. | 293 n-propyl alcohol | 0.589 | 1.3854 | wv spread | nspread | ratio | |
| Gray, D.E. | 293 n-propyl alcohol | 0.656 | 1.3834 | −0.17 | 0.0066999999 9999993 | −0.039411764 7058819 | −35.10119402 98511 |
| Gray, D.E. | 293 benzene | 0.486 | 1.5132 | | | | weighted ratio |
| Gray, D.E. | 293 benzene | 0.589 | 1.5012 | wv spread | nspread | ratio | |
| Gray, D.E. | 293 benzene | 0.656 | 1.4965 | −0.17 | 0.0167000000 000002 | −0.098235294 117648 | −15.23383233 53292 |
| Gray, D.E. | 293 bromnaphthalene | 0.486 | 1.6819 | | | | weighted ratio |
| Gray, D.E. | 293 bromnaphthalene | 0.589 | 1.6582 | wv spread | nspread | ratio | |
| Gray, D.E. | 293 bromnaphthalene | 0.656 | 1.6495 | −0.17 | 0.0324 294118 | −0.190588235 61729 | −8.654783950 |
| Gray, D.E. | 273 carbon disulfide | 0.486 | 1.6688 | | | | weighted ratio |
| Gray, D.E. | 273 carbon disulfide | 0.589 | 1.6433 | wv spread | nspread | ratio | |
| Gray, D.E. | 273 carbon disulfide | 0.656 | 1.6336 | −0.17 | 0.0352000000 000001 | −0.207058823 529412 | −7.889545454 54543 |
| Gray, D.E. | 293 carbon disulfide | 0.486 | 1.6523 | | | | weighted ratio |
| Gray. D.E. | 293 carbon disulfide | 0.589 | 1.6276 | wv spread | nspread | ratio | |
| Gray, D.E. | 293 carbon disulfide | 0.656 | 1.6182 | −0.17 | 0.0341 294118 | −0.200588235 27273 | −8.067272727 |
| Gray, D.E, | 293 carbon tetrachloride | 0.486 | 1.4676 | | | | weighted ratio |
| Gray, D.E. | 293 carbon tetrachloride | 0.589 | 1.4607 | wv spread | nspread | ratio | |
| Gray, D.E. | 293 carbon tetrachloride | 0.656 | 1.4579 | −0.17 | 0.0097000000 0000004 | −0.057058823 529412 | −25.55082474 22679 |
| Gray, D.E. | 293 chinolin | 0.589 | 1.6245 | wv spread | nspread | ratio | |
| Gray, D.E. | 293 chinolin | 0.656 | 1.6161 | −0.17 | 0.0308999999 999999 | −0.181764705 882352 | −8.891165048 54371 |
| Gray, D.E. | 293 chloral | 0.486 | 1.4624 | | | | weighted ratio |
| Gray, D.E. | 293 chloral | 0.589 | 1.4557 | wv spread | nspread | ratio | |
| Gray, D.E. | 293 chloral | 0.656 | 1.453 | −0.17 | 0.0093999999 9999985 | −0.055294117 6470579 | −26.27765957 44685 |
| Gray, D.E. | 293 chloroform | 0.486 | 1.453 | | | | weighted ratio |
| Gray, D.E. | 293 chloroform | 0.589 | 1.4467 | wv spread | nspread | ratio | |
| Gray, D.E. | 293 chloroform | 0.656 | 1.4443 | −0.17 | 0.0087000000 0000015 | −0.051176470 5882362 | −28.22195402 2988 |
| Gray, D.E. | 287.9 decane | 0.486 | 1.416 | | | | weighted ratio |
| Gray, D.E. | 287.9 decane | 0.589 | 1.4108 | wv spread | nspread | ratio | |
| Gray, D.E. | 287.9 decane | 0.656 | 1.4088 | −0.17 | 0.0071999999 9999987 | −0.042352941 1764698 | −33.26333333 33339 |
| Gray, D.E. | 293 ether, ethyl | 0.486 | 1.3576 | | | | weighted ratio |
| Gray, D.E. | 293 ether, ethyl | 0.589 | 1.3538 | wv spread | nspread | ratio | |
| Gray, D.E. | 293 ether, ethyl | 0.656 | 1.3515 | −0.17 | 0.0060999999 9999999 | −0.035882352 9411764 | −37.66475409 83607 |
| Gray, D.E. | 293 ethyl nitrate | 0.486 | 1.392 | | | | weighted ratio |
| Gray, D.E. | 293 ethyl nitrate | 0.589 | 1.3853 | wv spread | nspread | ratio | |
| Gray, D.E. | 293 ethyl nitrate | 0.656 | 1.383 | −0.17 | 0.0089999999 999999 | −0.052941176 4705876 | −26.12333333 33336 |
| Gray, D.E. | 293 formic acid | 0.486 | 1.3764 | | | | weighted ratio |
| Gray, D.E. | 293 formic acid | 0.589 | 1.3714 | wv spread | nspread | ratio | |
| Gray, D.E. | 293 formic acid | 0.656 | 1.3693 | −0.17 | 0.0071000000 0000011 | −0.041764705 8823536 | −32.78605633 80277 |
| Gray, D.E. | 293 glycerine | 0.486 | 1.4784 | | | | weighted ratio |
| Gray, D.E. | 293 glycerine | 0.589 | 1.473 | wv spread | nspread | ratio | |

TABLE V-continued

Following are the refractive indices of a fraction of the liquids which can function within a liquid prism, as compiled from referenced sources.

| Reference | Temp in K Material | Wavelength | Ref Index | | | | |
|---|---|---|---|---|---|---|---|
| Gray, D.E. | 293 glycerine | 0.656 | 1.4706 | −0.17 | 0.0078000000 0000003 | −0.045882352 9411766 | −32.05153846 15384 |
| Gray, D.E. | 293 hexane | 0.486 | 1.3799 | | | | weighted ratio |
| Gray, D.E. | 293 hexane | 0.589 | 1.3754 | wv spread | nspread | ratio | |
| Gray, D.E. | 293 hexane | 0.589 | 1.3734 | −0.103 | 0.0064999999 9999995 | −0.063106796 1165044 | −21.76310769 23079 |
| Gray, D.E. | 296.3 hexylene | 0.486 | 1.4007 | | | | weighted ratio |
| Gray, D.E. | 296.3 hexylene | 0.589 | 1.3945 | wv spread | nspread | ratio | |
| Gray, D.E. | 296.3 hexylene | 0.656 | 1.392 | −0.17 | 0.0087000000 0000015 | −0.051176470 5882362 | −27.19999999 99995 |
| Gray, D.E. | 293 methylene iodide | 0.486 | 1.7692 | | | | weighted ratio |
| Gray, D.E. | 293 methylene iodide | 0.589 | 1.7417 | wv spread | nspread | ratio | |
| Gray, D.E. | 293 methylene iodide | 0.656 | 1.732 | −0.17 | 0.0372000000 000001 | −0.218823529 411765 | −7.915053763 44084 |
| Gray, D.E. | 371.6 naphthalene | 0.486 | 1.6031 | | | | weighted ratio |
| Gray, D.E. | 371.6 naphthalene | 0.589 | 1.5823 | wv spread | nspread | ratio | |
| Gray, D,E. | 371.6 naphthalene | 0.656 | 1.5746 | −0.17 | 0.0285 | −0.167647058 823529 | −9.392350877 19299 |
| Gray, D.E. | 295.4 nicotine | 0.486 | | | | weighted ratio | |
| Gray, D.E. | 295.4 nicotine | 0.589 | 1.5239 | wv spread | nspread | ratio | |
| Gray, D.E. | 295.4 nicotine | 0.656 | 1.5198 | −0.17 | 0.0040999999 9999999 | −0.024117647 0588235 | −63.01609756 09758 |
| Gray, D.E. | 288.1 octane | 0.486 | 1.4046 | | | | weighted ratio |
| Gray, D.E. | 288.1 octane | 0.589 | 1.4007 | wv spread | nspread | ratio | |
| Gray, D.E. | 288.1 octane | 0.656 | 1.3987 | −0.17 | 0.0059000000 0000002 | −0.034705882 3529413 | 40.30152542 37287 |
| Gray, D.E. | 273 almond oil | 0.486 | 1.4847 | | | | weighted ratio |
| Gray, D.E. | 273 almond oil | 0.589 | 1.4782 | wv spread | nspread | ratio | |
| Gray, D.E. | 273 almond oil | 0.656 | 1.4755 | −0.17 | 0.0091999999 9999 | −0.054117647 | −27.26467391 |
| Gray, D.E. | 288.1 anise seed oil | 0.486 | 1.5743 | | | | weighted ratio |
| Gray, D.E. | 288.1 anise seed oil | 0.589 | 1.5572 | wv spread | nspread | ratio | |
| Gray, D.E. | 288.1 anise seed oil | 0.656 | 1.5508 | −0.17 | 0.0235000000 000001 | −0.138235294 117647 | −11.21855319 14893 |
| Gray, D.E. | 274.4 anise oil | 0.486 | 1.5647 | | | | weighted ratio |
| Gray, D.E. | 274.4 anise oil | 0.589 | 1.5475 | wv spread | nspread | ratio | |
| Gray, D.E. | 274.4 anise oil | 0.656 | 1.541 | −0.17 | 0.0237000000 000001 | −0.139411764 705883 | −11.05358649 78903 |
| Gray, D.E. | 293 bitter almond oil | 0.486 | 1.5623 | | | | weighted ratio |
| Gray, D.E. | 293 bitter almond oil | 0.589 | | wv spread | nspread | ratio | |
| Gray, D.E. | 293 bitter almond oil | 0.656 | 1.5391 | −0.17 | 0.0232000000 000001 | −0.136470588 235295 | −11.27788793 10344 |
| Gray, D.E. | 283 cassia oil | 0.486 | 1.6389 | | | | weighted ratio |
| Gray, D.E. | 283 cassia oil | 0.589 | 1.6104 | wv spread | nspread | ratio | |
| Gray, D.E. | 283 cassia oil | 0.656 | 1.6007 | −0.17 | 0.0382 | −0.224705882 352941 | −7.123534031 41361 |
| Gray, D.E. | 293.5 casia oil | 0.486 | 1.6314 | | | | weighted ratio |
| Gray, D.E. | 293.5 casia oil | 0.589 | 1.6026 | wv spread | nspread | ratio | |
| Gray, D.E. | 293.5 casia oil | 0.656 | 1.593 | −0.17 | 0.0384 | −0.225882352 941176 | −7.05234375 |
| Gray, D.E. | 296.5 cinnamon oil | 0.486 | 1.6508 | | | | weighted ratio |
| Gray, D.E. | 296.5 cinnamon oil | 0.589 | 1.6188 | wv spread | nspread | ratio | |
| Gray, D.E. | 296.5 cinnamon oil | 0.656 | 1.6077 | −0.17 | 0.0431000000 000001 | −0.253529411 764707 | −6.341276102 08815 |
| Gray, D.E. | 273 olive oil | 0.486 | 1.4825 | | | | weighted ratio |
| Gray, D.E. | 273 olive oil | 0.589 | 1.4763 | wv spread | nspread | ratio | |
| Gray, D.E. | 273 olive oil | 0.656 | 1.4738 | −0.17 | 0.0086999999 9999993 | −0.051176470 5882349 | −28.79839080 45979 |
| Gray, D.E. | 273 rock oil | 0.486 | 1.4644 | | | | weighted ratio |
| Gray, D.E. | 273 rock oil | 0.589 | 1.4573 | wv spread | nspread | ratio | |
| Gray, D.E. | 273 rock oil | 0.656 | 1.4545 | −0.17 | 0.0099000000 0000002 | −0.058235294 1176472 | −24.97626262 62626 |
| Gray, D.E. | 283.6 turpentine oil | 0.486 | 1.4817 | | | | weighted ratio |
| Gray, D.E. | 283.6 turpentine oil | 0.589 | 1.4744 | wv spread | nspread | ratio | |
| Gray, D.E. | 283.6 turpentine oil | 0.656 | 1.4715 | −0.17 | 0.0102 | −0.059999999 9999999 | −24.525 |
| Gray, D.E. | 293.7 turpentine oil | 0.486 | 1.4793 | | | | weighted ratio |
| Gray, D.E. | 293.7 turpentine oil | 0.589 | 1.4721 | wv spread | nspread | ratio | |
| Gray, D.E. | 293.7 turpentine oil | 0.656 | 1.4692 | −0.17 | 0.0101 7058823 | −0.059411764 08911 | −24.72910891 |
| Gray, D.E. | 288.7 pentane | 0.486 | 1.361 | | | | weighted ratio |
| Gray, D.E. | 288.7 pentane | 0.589 | 1.3581 | wv spread | nspread | ratio | |
| Gray, D.E. | 288.7 pentane | 0.656 | 1.357 | −0.17 | 0.004 | −0.023529411 7647059 | −57.6725 |
| Gray, D.E. | 313.6 phenol | 0.486 | 1.5558 | | | | weighted ratio |

TABLE V-continued

Following are the refractive indices of a fraction of the liquids which can function within a liquid prism, as compiled from referenced sources.

| Reference | Temp in K Material | Wavelength | Ref Index | | | | |
|---|---|---|---|---|---|---|---|
| Gray, D.E. | 313.6 phenol | 0.589 | 1.5425 | | | | |
| Gray, D.E. | 313.6 phenol | 0.656 | 1.5369 | −0.17 | wv spread 0.0189000000 000001 | nspread −0.111176470 588236 | ratio −13.82396825 39682 |
| Gray, D.E. | 355.7 phenol | 0.486 | 1.5356 | | | | weighted ratio |
| Gray, D.E. | 355.7 phenol | 0.589 | | | wv spread | nspread | ratio |
| Gray, D.E. | 355.7 phenol | 0.656 | 1.5174 | −0.17 | 0.0182 | −0.107058823 529412 | −14.17351648 35165 |
| Gray, D.E. | 289.6 styrene | 0.486 | 1.5659 | | | | weighted ratio |
| Gray, D.E. | 289.6 styrene | 0.589 | 1.5485 | | wv spread | nspread | ratio |
| Gray, D.E. | 289.6 styrene | 0.656 | 1.5419 | −0.17 | 0.024 588235 | −0.141176470 66667 | −10.92179166 |
| Gray, D.E. | 293 thymol | 0.486 | 1.5386 | | | | weighted ratio |
| Gray, D.E. | 293 thymol | 0.589 | | | wv spread | nspread | ratio |
| Gray, D.E. | 293 toluene | 0.486 | 1.507 | | | | weighted ratio |
| Gray, D.E. | 293 toluene | 0.589 | 1.4955 | | wv spread | nspread | ratio |
| Gray, D.E. | 293 toluene | 0.656 | 1.4911 | −0.17 | 0.0158999999 999998 | 0.093529411 7647047 | −15.94257861 63524 |
| Gray, D.E. | 300.05 Ammonium Chloride | 0.486 | 1.38473 | | | | weighted ratio |
| Gray, D.E. | 300.05 Ammonium Chloride | 0.589 | 1.37936 | | wv spread | nspread | ratio |
| Gray, D.E. | 300.05 Ammonium Chloride | 0.656 | 1.37703 | 0.17 | 0.0077000000 0000004 | 0.045294117 6470591 | −30.40196103 89609 |
| Gray, D.E. | 302.75 Ammonium Chloride | 0.486 | 1.35515 | | | | weighted ratio |
| Gray, D.E. | 302.75 Ammonium Chloride | 0.589 | 1.3505 | | wv spread | nspread | ratio |
| Gray, D.E. | 302.75 Ammonium Chloride | 0.656 | 1.3485 | 0.17 | 0.0066500000 0000005 | −0.039117647 0588238 | −34.47293233 08268 |
| Gray, D.E. | 298.65 Calcium chloride | 0.486 | 1.44938 | | | | |
| Gray, D.E. | 298.65 Calcium chloride | 0.589 | 1.44279 | | wv spread | nspread | ratio |
| Gray, D.E. | 298.65 Calcium chloride | 0.656 | 1.44 | −0.17 | 0.0093799999 9999994 | −0.055176470 588235 | −26.09808102 34543 |
| Gray, D.E. | 299.9 Calcium chloride | 0.486 | 1.40206 | | | | |
| Gray, D.E. | 299.9 Calcium chloride | 0.589 | 1.39652 | | wv spread | nspread | ratio |
| Gray, D.E. | 299.9 Calcium chloride | 0.656 | 1.39411 | −0.17 | 0.0079500000 0000012 | −0.046764705 8823537 | −29.81115723 27039 |
| Gray, D.E. | 298.8 Calcium chloride | 0.486 | 1.37876 | | | | |
| Gray, D.E. | 298.8 Calcium chloride | 0.589 | 1.37369 | | wv spread | nspread | ratio |
| Gray, D.E. | 298.8 Calcium chloride | 0.656 | 1.37152 | −0.17 | 0.0072399999 9999991 | 0.042588235 2941171 | −32.20419889 5028 |
| Gray, D.E. | 293.75 Hydrochloric acid | 0.486 | 1.41774 | | | | |
| Gray, D.E. | 293.75 Hydrochloric acid | 0.589 | 1.41109 | | wv spread | nspread | ratio |
| Gray, D.E. | 293.75 Hydrochloric acid | 0.656 | 1.40817 | −0.17 | 0.0095700000 0000008 | 0.056294117 6470593 | −25.01451410 65829 |
| Gray, D.E. | 291.75 Nitric acid | 0.486 | 1.40857 | | | | |
| Gray, D.E. | 291.75 Nitric acid | 0.589 | 1.40181 | | wv spread | nspread | ratio |
| Gray, D.E. | 291.75 Nitric acid | 0.656 | 1.39893 | −0.17 | 0.0096400000 | 0.056705882 3529417 | −24.66992738 58919 |
| Gray, D.E. | 284 Potash (caustic) | 0.486 | 1.40808 | | | | |
| Gray, D.E. | 284 Potash (caustic) | 0.589 | 1.40281 | | wv spread | nspread | ratio |
| Gray, D.E. | 284 Potash (caustic) | 0.656 | 1.40052 | −0.17 | 0.0075600000 0000001 | −0.044470588 2352942 | −31.49317460 31746 |
| Gray, D.E. | 284 Potassium cloride | 0.486 | 1.34719 | | | | |
| Gray, D.E. | 284 Potassium cloride | 0.589 | 1.34278 | | wv spread | nspread | ratio |
| Gray, D.E. | 284 Potassium cloride | 0.589 | 1.34087 | −0.103 | 0.0063200000 000001 | −0.061359223 3009719 | −21.85278639 24047 |
| Gray, D.E. | 284 Potassium cloride | 0.486 | 1.35645 | | | | |
| Gray, D.E. | 284 Potassium cloride | 0.589 | 1.35179 | | wv spread | nspread | ratio |
| Gray, D.E. | 284 Potassium cloride | 0.656 | 1.34982 | −0.17 | 0.0066299999 9999991 | −0.038999999 9999995 | −34.61076923 07697 |
| Gray, D.E. | 284 Potassium cloride | 0.486 | 1.36512 | | | | |
| Gray, D.E. | 284 Potassium cloride | 0.589 | 1.36029 | | wv spread | nspread | ratio |
| Gray, D.E. | 284 Potassium cloride | 0.656 | 1.35831 | −0.17 | 0.0068099999 9999998 | −0.040058823 5294117 | −33.90788546 25552 |
| Gray, D.E. | 294.6 Soda (caustic) | 0.486 | 1.41936 | | | | |
| Gray, D.E. | 294.6 Soda (caustic) | 0.589 | 1.41334 | | wv spread | nspread | ratio |
| Gray, D.E. | 294.6 Soda (caustic) | 0.656 | 1.41071 | −0.17 | 0.0086500000 0000005 | −0.050882352 9411767 | −27.72493641 61848 |
| Gray, D.E. | 291.07 Sodium chloride | 0.486 | 1.38322 | | | | |
| Gray, D.E. | 291.07 Sodium chloride | 0.589 | 1.37789 | | wv spread | nspread | ratio |
| Gray, D.E. | 291.07 Sodium chloride | 0.656 | 1.37562 | −0.17 | 0.0075999999 9999983 | −0.044705882 3529402 | −30.77044736 84218 |
| Gray, D.E. | 291.07 Sodium chloride | 0.486 | 1.36442 | | | | |
| Gray, D.E. | 291.07 Sodium chloride | 0.656 | 1.35751 | −0.17 | 0.0069099999 9999997 | −0.040647058 8235292 | −33.39749638 20551 |
| Gray, D.E. | 291.07 Sodium chloride | 0.486 | 1.34628 | | | | |
| Gray, D.E. | 291.07 Sodium chloride | 0.589 | 1.34191 | | wv spread | nspread | ratio |

TABLE V-continued

Following are the refractive indices of a fraction of the liquids which can function within a liquid prism, as compiled from referenced sources.

| Reference | Temp in K Material | Wavelength | Ref Index | | | | |
|---|---|---|---|---|---|---|---|
| Gray, D.E. | 291.07 Sodium chloride | 0.656 | 1.34 | −0.17 | 0.00627999999999984 | −0.0369411764705873 | −36.2738853503194 |
| Gray, D.E. | 295.8 Sodium nitrate | 0.486 | 1.39134 | | | | |
| Gray, D.E. | 295.8 Sodium nitrate | 0.589 | 1.38535 | wv spread | nspread | ratio | |
| Gray, D.E. | 295.8 Sodium nitrate | 0.656 | 1.38283 | −0.17 | 0.00851000000000002 | −0.0500588235294119 | −27.6241010575793 |
| Gray, D.E. | 293.3 Sulfuric acid | 0.486 | 1.44168 | | | | |
| Gray, D.E. | 293.3 Sulfuric acid | 0.589 | 1.43669 | wv spread | nspread | ratio | |
| Gray, D.E. | 293.3 Sulfuric acid | 0.656 | 1.43444 | −0.17 | 0.00724000000000014 | −0.0425882352941184 | −33.6816022099441 |
| Gray, D.E. | 293.3 Sulfuric acid | 0.486 | 1.42967 | | | | |
| Gray, D.E. | 293.3 Sulfuric acid | 0.589 | 1.42466 | wv spread | nspread | ratio | |
| Gray, D.E. | 293.3 Sulfuric acid | 0.656 | 1.42227 | −0.17 | 0.00740000000000007 | −0.0435294117647063 | −32.67377027027 |
| Gray, D.E. | 293.3 Sulfuric acid | 0.486 | 1.37468 | | | | |
| Gray, D.E. | 293.3 Sulfuric acid | 0.589 | 1.37009 | wv spread | nspread | ratio | |
| Gray, D.E. | 293.3 Sulfuric acid | 0.656 | 1.36793 | −0.17 | 0.00674999999999981 | −0.0397058823529401 | −34.4515703703713 |
| Gray, D.E. | 293.3 Sulfuric acid | 0.486 | 1.34285 | | | | |
| Gray, D.E. | 293.3 Sulfuric acid | 0.589 | 1.33862 | wv spread | nspread | ratio | |
| Gray, D.E. | 293.3 Sulfuric acid | 0.656 | 1.33663 | −0.17 | 0.00622000000000011 | −0.0365882352941183 | −36.5316881028932 |
| Gray, D E. | 299.9 Zinc chloride | 0.486 | 1.40797 | | | | |
| Gray, D.E. | 299.9 Zinc chloride | 0.589 | 1.40222 | wv spread | nspread | ratio | |
| Gray, D.E. | 299.9 Zinc chloride | 0.656 | 1.39977 | −0.17 | 0.00819999999999999 | −0.048235294117647 | −29.0196219512196 |
| Gray, D.E. | 296.4 Zinc chloride | 0.486 | 1.38026 | | | | |
| Gray, D.E. | 296.4 Zinc chloride | 0.589 | 1.37515 | wv spread | nspread | ratio | |
| Gray, D.E. | 296.4 Zinc chloride | 0.656 | 1.37292 | −0.17 | 0.00734000000000012 | −0.043176470588236 | −31.7978746594 |
| Gray, D.E. | 298.5 Ethyl alcohol | 0.486 | 1.36395 | | | | |
| Gray, D.E. | 298.5 Ethyl alcohol | 0.589 | 1.35971 | wv spread | nspread | ratio | |
| Gray, D.E. | 298.5 Ethyl alcohol | 0.656 | 1.35971 | −0.17 | 0.00424000000000002 | −0.0249411764705884 | −54.5166745283016 |
| Gray, D.E. | 300.6 Ethyl alcohol | 0.486 | 1.35986 | | | | |
| Gray, D.E. | 300.6 Ethyl alcohol | 0.589 | 1.35556 | wv spread | nspread | ratio | |
| Gray, D.E. | 300.6 Ethyl alcohol | 0.656 | 1.35372 | −0.17 | 0.00614000000000003 | −0.0361176470588237 | −37.4808469055373 |
| Gray, D.E. | 289 Fuchsin (nearly saturated | 0.486 | 1.3918 | | | | |
| Gray, D.E. | 289 Fuchsin (nearly saturated | 0.589 | 1.398 | wv spread | nspread | ratio | |
| Gray, D.E. | 289 Fuchsin(nearly saturated | 0.656 | 1.361 | −0.17 | 0.0307999999999999 | −0.181176470588235 | −7.512012987013 |
| Gray, D.E. | 289 Cyanin (saturated) | 0.486 | 1.3831 | | | | |
| Gray, D.E. | 289 Cyanin (saturated) | 0.589 | | wv spread | nspread | ratio | |
| Gray, D.E. | 289 Cyanin (saturated) | 0.656 | 1.3705 | −0.17 | 0.0125999999999999 | −0.0741176470588232 | −18.4908730158731 |

TABLE VI

LOSLO software code written in C++ controls the two prism angles to minimize diffraction.

```
//----------------------------------------------------------
#include <vcl.h>
#include <math.h>
#pragma hdrstop
#include "Thread.h"
#include "Convert.h"
#inciude "OutputT.h"
#include "Imput.h"
#pragma package(smart_init)
double convert(AnsiString);
int p;
//----------------------------------------------------------
void __fastcall TMain::Progress()
{
  MainForm->ProgressBar->Position = p;
}
//----------------------------------------------------------
```

TABLE VI-continued

LOSLO software code written in C++ controls the two prism angles to minimize diffraction.

```
__fastcall TMain::TMain(bool CreateSuspended): TThread(CreateSuspended)
{
 Priority = tpNormal;
 FreeOnTerminate = true;
}
//------------------------------------------------------------
void __fastcall TMain::Execute()
{
 double Incl = convert(InputForm—>TIncl->Text);
 if(InputForm->Inc1N->Checked == true) Inc 1 = Inc1 * -1;
 double Inc2 = convert(InputForm->TInc2->Text);
 if(InputForm->Inc2N->Checked == true) Inc2 = Inc2 * -1;
 double Inc3 = convert(InputForm->TInc3->Text);
 if(InputForm->Inc3N->Checked = true) Inc3 = Inc3 * -1;
 double Mat2L = convert(InputForm->TMat2L->Text);
 double Mat2H = convert(InputForm->TMat2R->Text);
 double Off2B = convert(InputForm->TOff2B->Text);
 double Off2E = convert(InputForm->TOff2E->Text);
 double Off2I = convert(InputForm->TOff2I->Text);
 double Off3B = convert(InputForm->TOff3B->Text);
 if(InputForm->Off3BN->Checked = true) Off3B = Off3B * -1;
 double Off3E = convert(InputForm->TOff3E->Text);
 double Off3I = convert(InputForm->TOff3I->Text);
 double Mat3B = convert(InputForm->TMat3B->Text);
 double Mat3E = convert(InputForm->TMat3E->Text);
 double Mat3I = convert(InputForm->TMat3I->Text);
 double Tol1 = convert(InputForm->TTol1->Text);
 double Tol2 = convert(InputForm->TTol2->Text);
 double Tol3 = convert(InputForm->TTol3->Text);
//--------------------------------------------------------------------
 double Mat3L = Mat3B;
 double Mat3H = Mat3B;
 double Off2 = Off2B;
 double Off3 = Off3B;
 double Ref1L = 0;
 double Ref1H = 0;
 double Ref2L = 0;
 double Ref2H = 0;
 double Ref3L = 0;
 double Ref3H = 0;
 double x = 0;
 double loop;
 if(Mat3I != 0){
  if(Mat3B != Mat3E) loop = 1/((Mat3E-Mat3B)/Mat3I)*100;}
 double count = 0;
 if(Mat3E == Mat3B ){
  p = 100;
  Syncnronize(Progress);}
 double Range;
 Range = 2;
 if(Mat3T == 0)
 {
  Mat3I = 1;
  Mat3H = Mat3B;
  Mat3L = Mat3E;
  Range = Mat3L - Mat3H;
  p = 100;
  Synchronize(Progress);
 };
 while (Mat3H <= Mat3E)
 {
  while (Mat3L <= Mat3H + Range)
  {
   while (Off2 <= Off2E)
   {
    while (Off3 <= Off3E)
    {
     if (MainForm->Start->Enabled)
     {
      Ref3L = 0;
      Ref3H = 0;
      Ref1H = asin(sin(Inc1)/Mat2H);
      Ref2L = asin(Mat2L * sin(Ref1L-Off2)/Mat3L);
      Ref2H = asin(Mat2H * sin(Ref1H-Off2)/Mat3H);
      x = Mat3L * sin(Ref2L-Off3);
      if(fabs(x) < 1)Ref3L = asin(x)+Offf2+Off3;
```

TABLE VI-continued

LOSLO software code written in C++ controls the two prism angles to minimize diffraction.

```
        x = Mat3H * sin(Ref2H-Off3);
        if (fabs(x) < 1) Ref3H = asin(x)+Off2+Off3;
        double Rel1 = Ref3L - Ref3H;
        if(fabs(Rel1) < Tol1)
        {
         if(Ref3L != 0 && Ref3H != 0)
         {
          if (MainForm->List->Items->Count > 20000)
          {
           MainForm->Start->Caption = "Next";
           Suspend();
          };
          AnsiString Inc1a = Inc1;
          AnsiString Off2a = Off2;
          AnsiString Off3a = Off3;
          AnsiString Mat3La = AnsiString(Mat3L);
          AnsiString Mat3Ha = AnsiString(Mat3H);
          AnsiString Ref3L1 = AnsiString(Ref3L);
          AnsiString Ref3H1 = AnsiString(Ref3H);
          AnsiString Relaa = AnsiString(Rel1);
          if (Inc2 == Inc1) MainForm->List->Items->Add(""+ Inc1a +" "+ Off2a +" "+
Off3a +" "+ Mat3La +" "+ Mat3Ha +" "+ Ref3L1 +" "+ Ref3H1 +" "+Rel1);
          else
          {
           Ref3L=0;
           Ref3H=0;
           Ref1L = asin(sin(Inc2)/Mat2L);
           Ref1H = asin(sin(Inc2)/Mat2H);
           Ref2L = asin(Mat2L * sin(Ref1L-Off2)/Mat3L);
           Ref2H = asin(Mat2H * sin(Ref1H-Off2)/Mat3H);
           x = Mat3L * sin(Ref2L-Off3);
           if (fabs(x) < 1) Ref3L = asin(x)+Off2+Off3;
           x = Mat3H * sin(Ref2H-Off3);
           if (fabs(x) < 1) Ref3H = asin(x)+Off2+Off3;
           double Rel2 = Ref3L - Ref3H;
           if (fabs(Rel2) < Tol2)
           {
            if(Ref3L != 0 && Ref3H != 0)
            {
             AnsiString Inc2a = Inc2;
             AnsiString Ref3L2 = AnsiString(Ref3L);
             AnsiString Ref3H2 = AnsiString(Ref3H);
             AnsiString Rel2a = AnsiString(Rel2);
             if (Inc3 == Inc2)
             MainForm->List->Items->Add(""+ Inc1a +" "+ Off2a +" "+ Off3a
+" "+ Mat3La +" "+ Mat3Ha +" "+ Ref3L1 +" "+ Ref3H1 +" "+ Rel1);
             MainForm->List->Items->Add (""+ Inc2a +" "+ Off2a +" "+
Off3a +" "+ Mat3La +" "+ Mat3Ha +" "+ Ref3L2 +" "+ Ref3H2 +" "+ Rel2);
            }
            else
            {
             Ref3L =0;
             Ref3H=0;
             Ref1L = asin(sin(Inc3)/Mat2L);
             Ref1H = asin(sin(Inc3 )/Mat2H);
             Ref2L = asin(Mat2L * sin(Ref1L-Off2)/Mat3L);
             Ref2H = asin(Mat2H * sin(Ref1H-Off2)/Mat3H);
             x = Mat3L * sin(Ref2L-Off3);
             if(fabs(x) < 1) Ref3L = asin(x)+Off2+Off3;
             x = Mat3H * sin(Ref2H-Off3);
             if (fabs(x) < 1) Ref3H = asin(x)+Off2+Off3;
             double Rel3 = (Ref3L - Ref3H);
             if (fabs(Rel3) < Tol3)
             {
              if(Ref3L != 0 && Ref3H != 0)
              {
               AnsiString Inc3a = Inc3;
               Ansistring Ref3L3 = AnsiString(Ref3L);
               AnsiString Ref3H3 = AnsiString(Ref3H);
               AnsiString Rel3a = AnsiString(Rel3);
               MainForm->List->Items->Add(""+ Inc1a +" "+ Off2a +" "+
Off3a +" "+ Mat3La +" "+ Mat3Ha +" "+ Ref3L1 +" "+ Ref3H1 +" "+ Rel1);
               MainForm->List->Items->Add (""+ Inc2a +" "+ Off2a +" "+
Off3a +" "+ Mat3La +" "+ Mat3Ha +" "+ Ref3L2 +" "+ Ref3H2 +" "+ Rel2);
               MainForm->List->Items->Add (""+ Inc3a +" "+ Off2a +" "+
Off3a +" "+ Mat3La +" "+ Mat3Ha +" "+ Ref3L3 +" "+ Ref3H3 +" "+ Rel3);
```

TABLE VI-continued

LOSLO software code written in C++ controls the two prism angles to minimize diffraction.

```
            };
           };
          };
         };
        };
       };
      };
     };
    };
   Off3 = Off3 + Off3I;
   {
   else{
   Mat3L = 2;
   Mat3R = 2;
   Off3 = 2;
   Off2B = 2;
   Off2B = 2;
   }
   off2 = Off2 + Off2I;
   Off3 = Off3B;
   }
  Mat3L = Mat3L + Mat3I;
  Off2 = Off2B;
  }
 Mat3H = Mat3H + Mat3I;
 Mat3L = Mat3H;
 count = count + loop;
 p = int(count);
 Synchronize(Progress);
 }
p = 0;
Synchronize(Progress);
if(MainForm->Start->Caption == "Stop") MainForm->Start->Caption = "Start";
MainForm->Start->Enabled=true;
}
//-------------------------------------------------------
```

What is claimed is:

1. An optical system adapted for selecting the resultant trajectory of an incident beam of electromagnetic energy comprising:
   a) a first variable prism;
   b) a second variable prism;
   c) a computer in communication with at least one said variable prism so as to send a signal to vary said prism's affect on said resultant trajectory; and
   d) wherein spectral dispersion of said beam caused by the first prism is reduced by the second prism.

2. The optical system described in 1, wherein a means is provided for altering the temperature of at least one said variable prism.

3. The optical system described in 1, wherein a means is provided for mounting said system within the wall of a building.

4. The optical system described in 1, wherein a means is provided for mounting said system on a vehicle.

5. The optical system described in 1, further including an array of prisms similar to said first variable prism wherein constituent prisms of said array are operated in unison to function as one large variable prism.

6. The optical system described in 1, wherein the shape of at least one said variable prism is alterable due to the elastic properties of a membrane through which said incident beam must pass before achieving said resultant trajectory.

7. An optical system adapted for selecting the resultant direction of an incident beam of electromagnetic energy comprising: a) a first variable prism; b) a second variable prism; c) a means to adjust the temperature of at least one said prism; and d) wherein spectral dispersion of said beam caused by the first prism is reduced by the second prism.

8. The optical system described in 7, wherein a computer is in communication with at least one said variable prism so as to send a signal to vary said prism's affect on said resultant trajectory.

9. The optical system described in 7, wherein a means is provided for mounting said system within the wall of a building.

10. The optical system described in 7, wherein a means is provided for mounting said system on a vehicle.

11. The optical system described in 7, further including an array of prisms similar to said first variable prism wherein constituent prisms of said array are operated in unison to function as one large variable prism.

12. The optical system described in 7, wherein the shape of at least one said variable prism is alterable due to the elastic properties of a membrane through which said incident beam must pass before achieving said resultant trajectory.

13. An optical system adapted for selecting the resultant direction of an incident beam of electromagnetic energy comprising:
   a) a first variable prism array consisting of at least two similar prisms operated in unison;
   b) a second variable prism array consisting of at least two similar prisms operated in unison; and
   d) wherein said beam passing through the first prism array experiences spectral dispersion which is reduced by the second prism array.

14. The optical system described in 13, wherein a computer is in communication with at least one said prism so as to send a signal to vary said prism's affect on said resultant beam.

15. The optical system described in 13, wherein a means is provided for mounting said system within the wall of a building.

16. The optical system described in 13, wherein a means is provided for mounting said system on a vehicle.

17. The optical system described in 13, wherein a means is provided for altering the temperature of at least one said prism.

18. The optical system described in 13, wherein the shape of at least one prism within one said variable prism array is alterable due to the elastic properties of a membrane through which said incident beam must pass before achieving said resultant direction.

19. An optical system adapted for selecting the resultant direction of an incident beam of electromagnetic energy comprising:

a) a first variable prism;

b) a second variable prism;

c) wherein the shape of at least one said prism is alterable due to the elastic properties of a membrane through which said incident beam must pass before achieving said resultant direction; and d) wherein spectral dispersion caused by the first prism is reduced by the second prism.

20. The optical system described in 19, wherein a computer is in communication with at least one said variable prism so as to send a signal to vary said prism's affect on said resultant trajectory.

21. The optical system described in 19, wherein a means is provided for mounting said system within the wall of a building.

22. The optical system described in 19, wherein a means is provided for mounting said system on a vehicle.

23. The optical system described in 19, further including an array of prisms similar to said first variable prism wherein constituent prisms of said array are operated in unison to function as one large variable prism.

24. The optical system described in 19, wherein a means is provided for altering the temperature of at least one said variable prism.

* * * * *

UNITED STATES PATENT AND TRADEMARK OFFICE
CERTIFICATE OF CORRECTION

PATENT NO. : 6,230,453 B1
DATED : May 15, 2001
INVENTOR(S) : Alden

It is certified that error appears in the above-identified patent and that said Letters Patent is hereby corrected as shown below:

Please delete columns 1-30 and substitute columns 1-26 as per attached.

Signed and Sealed this

Twenty-fourth Day of December, 2002

JAMES E. ROGAN
*Director of the United States Patent and Trademark Office*

VARIABLE VIEW WINDOW

CROSS-REFERENCE TO RELATED APPLICATIONS

This application is entitled to the benefit of Provisional Patent Application Ser. No. 60/110,487 filed Dec. 1, 1998 and of Provisional Patent Application Ser. No. 60/111,708 filed Dec. 10, 1998.

BACKGROUND FIELD OF INVENTION

This invention relates to windows that are mounted in a building or on a vehicle, specifically to improved design, structure and use of windows.

BACKGROUND—DESCRIPTION OF PRIOR ART

Originally windows were created and manufactured to enable light to enter buildings and to enable those inside to see outside. For centuries the use and construction of windows changed little. Inventors experimented with incorporating different materials resulting in ornamental windows such as stained glass. By late in the twentieth century, advanced windows include many beneficial adaptations. Commonly, multiple panes are used to maximize energy efficiency often with vacuum or with injected gas between the panes. The widow panes incorporate many more substances added during various stages of production. These substances create various beneficial effects such as tinting and to manipulate selected band widths of electromagnetic energy in desirable ways. Most recently windows have incorporated means to adjust between clear and opaque states as desired. This adaptation effectively converges the historic window blind function into the window itself. Even with all the advances in window materials and manufacture, the main functions and generally passive role of windows have remained largely unchanged since their original conception and production many centuries ago and subsequent widespread use to this day.

The effect of variable refraction using fluids was observed in the construction of variable prisms over a century ago. Subsequently, many well documented constructs have employed the variable refraction effect of fluid prisms and lenses to achieve desirable objectives. Particularly camera lenses, ray stabilizers, laser ray directing devices, and movie projection devices have all widely used the variable refraction properties of fluid prisms and lenses. Heretofore the concept, design and manufacture of fluid prisms as functioning window panes incorporated into a building or vehicle has not existed. Converging window and fluid prism technologies as herein described provides abundant and valuable benefits heretofore unrecognized and unaddressed in prior art.

SUMMARY

The invention described herein incorporates a variable fluid prism between the panes of a window mounted in a building or on a vehicle. This novel construction enables a user to adjust the view that the window provides from any given single vantage point simply by adjusting the angle contained within the fluid prism. Moreover a second fluid prism is incorporated to reduce dispersion. Also incorporated are temperature regulators, insulators, mounting hardware, and software code to adjust prism angles to minimize dispersion among visible wavelengths.

OBJECTS AND ADVANTAGES

Accordingly, several objects and advantages of my invention are apparent. The invention increases the functions that a window performs in many circumstances. The invention also improves the aesthetic appeal provided by a window within a building.

Many people can not autonomously adjust their position to see the full hemisphere possible on the outside of a window. By making the window itself adjustable as herein described, the user can select which portion of the external hemisphere she wishes to view from nearly any single vantage point inside a structure. Moreover as provided herein, the view selected can again be altered whenever desired. Similarly, drivers of a vehicle are somewhat restricted regarding their physical mobility. Particularly, the art includes many examples intended to eliminate blind spots in a vehicle. The art described herein enables a driver to manipulate the view provided by the window glass thereby eliminating blind spots without mirrors or reflecting prisms.

The value of each particular window from an aesthetic standpoint is related to the beauty of the view it provides. Heretofore, the view provided by a window in a building was limited to whatever view an architect had the foresight to plan into construction or was later altered externally. Some windows had excellent views and some windows had poor views. The view from any given vantage point within the building was virtually unalterable. As described herein, the present invention enables the view from a single vantage point through a single window to be infinitely altered in nearly a 180 degree hemisphere. Moreover different views can be selected nearly instantly and changed anytime desired. Thus a user can view a sunrise in the east and later a sunset in the west without ever altering their own perspective. Also, a window high up a wall that historically only provided a view of the sky can be adjusted as described herein to provide views of the ground beneath it in any direction. All of these examples include greatly enhanced aesthetic appeal.

Similarly, the practicality of the view that a given window provides has heretofore been unalterable. The addition of mirrors to the external walls of a building or the sides of a vehicle have been used to enable the user to view different directions from a given vantage point. Alternately, cameras and monitors have been used to provide views. This invention uses fluid refraction within the window to achieve alternate views. If the user wants to view the sidewalk or driveway outside of the building for example, she can adjust the window refraction instead of adjusting her vantage point or relying on other technology. If the driver of a vehicle wants to view the blind spot beside her vehicle, she can adjust the side window of her car to provide the view very comfortably through fluid refraction within the window.

Further objects and advantages will become apparent from a consideration of the drawings and ensuing description.

DRAWING FIGURES

FIG. 1 single fluid prism window.
FIG. 2 double fluid prism window.
FIG. 3 double fluid columnar window closed.
FIG. 4 double fluid columnar window closed, top view.
FIG. 5 double fluid columnar window open.
FIG. 6 double fluid columnar window open, top view.
FIG. 7 single fluid columnar window.

REFERENCE NUMERALS IN DRAWINGS 11 interior window pane
13 window mount A 15 cylinder A
17 stretchable seal A
19 middle pane A
21 insulating chamber A
23 exterior pane A
24 refractive fluid A
25 temperature regulator A
27 mounting flange A
29 cylinder B1
31 mounting assembly B
33 cylinder B2
35 window bracket B
37 stretchable seal B
39 median pane B
41 exterior pane B
43 refractive fluid B1
45 temperature regulator B
47 interior pane B
49 refractive fluid B2
51 window trim B
53 fluid port 2
55 interior pane C
57 median pane C
59 cylinder C
61 temperature regulator C
63 mounting assembly C
65 exterior pane C
67 insulating chamber C
69 middle pane C
71 stretch lining
73 median pane C
75 interior pane C
77 fluid port 2
79 cylinder C2
81 cylinder C3
83 fluid column C1
85 fluid column C2
87 fluid column C3
88 fluid column C4
89 fluid column C5
91 fluid port 3
93 fluid port 4
95 fluid reservoir 1
97 fluid reservoir 2
99 Fluid pump
101 median pane C
103 cylinder C4
105 cylinder flange
107 interior pane C
109 vertical stretch wall 1
111 diagonal stretch wall 1
113 vertical stretch wall 2
115 diagonal stretch wall 2
117 pane adhesive
119 stretch lid
121 middle pane C
123 exterior pane C
125 insulating chamber C Description—FIGS. 1 and 2—Alternate Embodiments A first embodiment of the variable view window is illustrated in FIGS. 1 and 2.

FIG. 1 shows the components that form a single fluid prism window. A interior window pane 11 is a rigid material through which some spectrums of electromagnetic radiation pass. It forms one side of the single fluid prism window. Attached to the interior pane 11 are four mounts, window mount 13 is one such mount. The window mount 13 forms a rigid connection between the interior window pane 11 and a cylinder 15. The cylinder 15 is similarly fastened to a middle pane 19 by a mount. The middle pane 19 is a rigid material through which some spectrums of electromagnetic radiation passes. A stretchable seal 17 sealably connects the interior window pane 11 to the middle pane 19 such that a water tight compartment is formed between these panes. The stretchable seal 17 is a stretchable or flexible manufacture. It is often manufactured from materials including rubber or petroleum feed stocks. Filling the compartment between the interior pane 11 and the middle pane 19 is a refractive fluid 24. The refractive fluid 24 is a fluid with a refractive index (Table V includes a fraction of the fluids that have refractive indices). (Note that the term "fluid" as used throughout this document refers to any substance that is alterable with the shape of its container or tends to take the shape of its container.) An insulating chamber 21 is formed between the middle pane 19 and a exterior pane 23 which are sealably connected to one another at their edges. The insulating chamber 21 may be filled with a vacuum or other means of transparent insulation. A temperature regulator 25 coil is comprised from a barely visible material through which electricity flows. The temperature regulator 25 communicates with the refractive fluid 24. A mounting flange 27 is rigidly connected to the exterior pane 23 and the middle pane 19 such that the assembly can be securably mounted to a structure.

FIG. 2 shows the components of a double fluid prism window. A cylinder 29 connects a interior pane 47 to a median pane 39. Also connected to the median pane 39 and cylinder 29 assembly is a mounting assembly 31. A cylinder 33 connects the median pane 39 to a exterior pane 41. The median pane 39, exterior pane 41, and interior pane 47 are each formed by rigid materials through which some spectrums of electromagnetic radiation pass. Sealably around the edges of all of these panes and forming two water tight chambers between the three panes is a stretchable seal 37. The stretchable seal 37 can bend and stretch such that panes can move relative to each other. It is often manufactured from materials including rubber or petroleum feed stocks. A refractive fluid 43 is contained in the chamber between the exterior pane 41 and the median pane 39. The refractive fluid 43 is a fluid with a refractive index through which some wavelengths of electromagnetic energy passes. A temperature regulator 45 is housed within the median pane 39. The temperature regulator 45 is barely visible and conducts electricity. A refractive fluid 49 is contained between the interior pane 47 and the median pane 39. The refractive fluid 49 is a fluid with a refractive index through which visible light passes. A window trim 51 goes around the other components. The window trim 51 is rigidly attached at the edges of the outermost panes, it protects the assembly and adds aesthetic value when installed.

Operation of the Invention in Alternate Embodiments

The components of FIG. 1 combine to form a single fluid prism window. As the cylinder 15 is caused to expand, it pushes one edge of the interior window pane 11 away from the middle pane 19. This movement causes the two panes to reside in relatively non-parallel planes. Thus the refractive fluid 24 forms a prism causing refraction of visible light passing there through. Using multiple cylinders similar to the cylinder 15 but attached in the other three corners of the panes enables the panes to be moved into many different planes. Cylinders depicted in the drawing are controlled by hydraulic pressure through a remote pump and control mechanism which are well known in the art and therefore not shown. Such movement causes the refractive fluid 24 to form virtually any desired angle less than 90 degrees. Using a fluid with a high refractive index such as methylnapththalene will create a high refraction thus requiring less cylinder extension to achieve high light refraction. Table V lists a fraction of the many possible refractive fluids.) Unfortunately in many refractive fluids, high dispersion across the visible light spectrum will be concomitant with the high light refraction achieved. This causes the user's view to be distorted by color separation. In the FIG. 1 embodiment, the solution to the dispersion and resultant color separation problem is to use a refractive fluid with a low dispersion in the visible spectrum. (Table V discloses the refractive properties of some materials. These are a fraction of the refractive fluids that can be utilized). The last column "Ratio" describes the amount of dispersion a given material has as a function of the wavelength range described range. The higher the "Ratio", the lower the dispersion. Ethyl alcohol (solutions in) for example has a relatively low dispersion with a "Ratio" of −0.024941. Using this fluid will lessen the color separation problem.

The color separation problem posed by dispersion can be easily explored using the "LOSLO" software included herein. This software was developed to operate the fluid prism window and control color separation. Using Snell's Law, it can determine the relative wavelength trajectory differences in any refractory material that cause the color separation. The LOSLO software reveals that an ethyl alcohol (solutions in) prism angle range of −0.216 radians through 0.216 radians can be achieved while maintaining a tolerance of 0.001 radians refracted trajectory difference between the two visible wavelengths listed I Table V. Table I discloses the result when considering three incident angles simultaneously.

refraction achieved by the two fluids trajectories. Also note that increasing the prism angle in ethyl alcohol (solutions in) beyond 0.216 radians will cause color separation exceeding the 0.001 relative trajectory level. The user will see color distortion with any relative trajectory difference depending upon their distance from the refracting window. The goal then is to minimize any difference in relative trajectory across the visible spectrum.

FIG. 2 depicts the double fluid prism window. This embodiment presents an alternate solution to the color separation caused by dispersion discussed above. Mounting the assembly with the mounting 31 and similar mounting hardware on the other corners causes the median pane 39 to be in a permanently fixed position. Cylinders depicted in the drawing are controlled by hydraulic pressure through a remote pump and control mechanism which are well known in the art and therefore not shown. Expanding and contracting the cylinder 29 (and similar cylinders located at other corners) will cause the interior pane 47 to move to different planes relative to the median pane 39. This causes the refractive fluid 49 to form many different prism angles as desired. Similarly, expanding and contracting cylinders such as cylinder 33 will cause the exterior pane 41 to move to planes non-parallel to the median plane 39. Thus forming many possible prism angles with refractive fluid 43. The stretchable seal 37 enables these panes to move relative to each other while still containing their respective refractive fluids. The temperature regulator 45 keeps the fluid at a desired temperature which is desirable since the refractive index of a material generally varies with temperature.

In operation, the double fluid prism window is designed such that one fluid prism does most of the refraction and the other fluid prism neutralizes the dispersion caused by the

TABLE I

Ethyl Alcohol (solutions in) maximum prism angle while maintaining relative trajectory tolerance of .001 radians across three incident (all angles are in radians).

| Incident Angle | Prism Angle | Trajectory of 1st wavelength | Trajectory of 2nd wavelength | Relative Trajectory Angle |
|---|---|---|---|---|
| 0.52 | 0.216 | 0.430740593273115 | 0.431739667349834 | −.000999074076718731 |
| 0.32 | 0.216 | 0.238811836432108 | 0.23974608306997 | −.000934246637862124 |
| 0.02 | 0.216 | −0.0602629892363292 | −0.0593184626870569 | −.000944526549272233 |

Note that the ray with the initial incident angle of 0.52 has a final trajectory of approximately 0.43. The difference between these angles is 0.09. 0.09 represents the total first prism. The "LOSLO" software is designed to operate these two fluid prisms such that color distortion caused by dispersion is minimized.

TABLE II using water as the first refractive fluid and methylnapthalene as the second refractive fluid, the maximum refraction achievable while maintaining relative trajectory tolerance of .0001 radians across three incident angles (all angles are in radians).

| Incident Angle | 1st Prism Angle | 2nd Prism Angle | Trajectory of 1st wavelength | Trajectory of 2nd wavelength | Relative Trajectory Angle |
|---|---|---|---|---|---|
| 0.52 | 0.396 | −0.053 | 0.39837 | 0.39847 | −9.7618E−5 |
| 0.32 | 0.396 | −0.053 | 0.20724 | 0.20725 | −1.7305E−5 |
| 0.02 | 0.396 | −0.053 | −0.09519 | −0.09528 | 9.2163E−5 |

Note that the ray with the initial incident angle of 0.52 has a final trajectory of approximately 0.40. The difference between these angles of 0.12 radians represents the total refraction achieved on the two fluids' trajectories. The FIG. 2 embodiment with water and methylnapthalene achieved a 30% (from 0.9 to 0.12) greater refraction than was achieved with the FIG. 1 single fluid prism window with a concomitant 1000% decrease in the dispersion (from 0.001 to 0.0001).

Another example of how the FIG. 2 double fluid prism window can use two fluids together to achieve high refraction and low dispersion is described in Table III.

TABLE III using octane as the first refractive fluid and pentane as the second refractive fluid, the maximum refraction achievable while maintaining relative trajectory tolerance of .0005 radians across three incident angles (all angles are in radians).

| Incident Angle | 1st Prism Angle | 2nd Prism Angle | Trajectory of 1st wavelength | Trajectory of 2nd wavelength | Relative Trajectory Angle |
|---|---|---|---|---|---|
| 0.52 | 0.014 | −0.431 | 0.992050137205817 | 0.991598815447285 | −0.000451321758532908 |
| 0.17 | 0.014 | −0.431 | 0.386821210548222 | 0.387130340908125 | −0.000309130359902765 |
| 0.02 | 0.014 | −0.431 | 0.211241377302523 | 0.211665137702471 | −0.000423760399948264 |

Note that the ray with the initial incident angle of 0.52 has a final trajectory of approximately 0.99. The difference between these of 0.47 represents the total refraction achieved on the two fluids' trajectories. Thus the FIG. 2 embodiment with octane and pentane can bend a normal (90 degree) light ray up to 0.47 radians in any direction from the normal to the incident surface.

A second problem posed by both the FIG. 1 and FIG. 2 embodiments is the range of movement that the panes must under go relative to one another in order to achieve high levels of refraction. Assume for example that the interior pane 47 was a four foot square window. In the Table III example, the 2nd prism angle of 0.431 would require that one edge of the window move out from the wall (into the room) about 1.5 feet. Having the window panes undergo movement of this magnitude is often not desirable. It can be aesthetically distracting to look at or it can be bumped into, also very impractical as with automobile windows for example. Larger window sizes with greater movement would often not be practicable using the FIG. 1 and FIG. 2 embodiments.

FIGS. 3 through 7—Preferred Embodiments

FIG. 3 shows the components that form double fluid columnar window. The window is shown in the fully collapsed position.

A cylinder 59 is in the fully collapsed position as are the other depicted cylinders. Cylinders depicted in the drawing are controlled by hydraulic pressure through a remote pump and control mechanism which are well known in the art and therefore not shown. The cylinder 59 connects to a median pane 57. A fluid port 53 is the means by which fluid enters into one column of the assembly. The fluid port 53 communicates with a chamber housed between two glass panes. An interior pane 55 forms one side of the window assembly. A temperature regulator 61 extrudes beyond the median pane 57 in which it resides. A mounting assembly 63 connects the corner of the median pane 57 to a structure with protruding bolts.

FIG. 4 shows the top view of the embodiment depicted in FIG. 3. The components form a double fluid columnar window. The window is shown in the fully collapsed position.

A exterior pane 65 forms the outermost surface of the window assembly. Its edges are sealably connected to the middle pane 69. A insulating chamber 67 is formed between these two panes, it may contain a vacuum or other transparent insulating material. A median pane 73 resides in close proximity to the middle pane 69 yet between the panes is housed a stretch lining 71. The lining is a highly elastic material that forms the prismatic surfaces which contain liquids. A interior pane 75 forms one side of the window assembly. It also resides close to the median pane 73. A fluid port 77 communicates fluid to one of the columns residing between the interior pane 75 and the median pane 73 of the assembly.

FIG. 5 shows the embodiment depicted in FIGS. 3 and 4 except in the open position. The components form a double fluid columnar window.

A cylinder 79 connects the median pane 73 to the middle pane 69. It is shown in the expanded position pushing the two panes apart. A cylinder 81 connects the median pane 73 to the interior pane 75. It is shown in the expanded position pushing the two panes apart. A fluid column 83 has been opened wide by the separation of the median pane 73 and the middle pane 69. For illustration, the top of the fluid column 83 has been removed. It comprises a three dimensional triangular chamber that is bounded by highly elastic material such as rubber. It is filled with air. Similarly, the fluid column 85 has been opened and is illustrated with top removed. This column is depicted containing a fluid other than air and is one component of the total prismatic effect of one side of this window. Similarly a fluid column 87 and a fluid column 89 have been opened by the movement of the interior pane 75 away from the median pane 73. These two columns contain the second refractive fluid. A fluid port 91 and a fluid port 93 are two of the many ports, each one communicating with one fluid column. A fluid reservoir 95 contains refractive fluid to be pumped to and from one side of the assembly and a fluid reservoir 97 contains refractive fluid to be pumped to and from the other side of the assembly. A fluid pump 99 is used to convey fluids to and from the assembly columns and its cylinders.

FIG. 6 shows the top view of the embodiment depicted in FIGS. 3, 4, and 5. The components form a double fluid columnar window.

A cylinder 103 connects median pane 73 to an internal pane 107. For illustrative purposes, the tops have been removed from these columns. A vertical stretch wall 109 forms the side of a fluid column. A diagonal stretch wall 111 forms half of an "X" shape with the diagonal stretch wall 115 forming the other half of the "X". Together they with their closest two vertical stretch walls, describe four separate columns including fluid column 83 and fluid column 85. Each of these columns can be filled with fluid or air as desired. A pane adhesive 117 connects the stretch lining material to the interior pane 75. A stretch lid 119 covers a series of columns. Normally all columns would be covered by such lids. A middle pane 121 provides the rigid support for one side of prism columns. It is sealably connected to exterior pane 123 such that a insulating chamber 125 is formed.

FIG. 7 illustrates a single fluid columnar window. It has all of the elements described in FIGS. 3 through 6 with the exception that is basically cut in half and uses only one refractive fluid with air.

Operation—Preferred Embodiments FIGS. 3 through 7

FIG. 3 depicts the double liquid columnar window in the closed position. In this position, all prismatic surfaces are parallel to one another and now net refraction is taking place. It is therefore providing the view of a normal window. The cylinders including cylinder 59 are fully contracted. All of these cylinders are controlled by pressure provided by a pump; these elements are well known in the art and are therefore not shown. Mounting assembly 63 is used to mount the assembly onto a structure, similar such hardware is located on the other 3 corners (not shown) of the median pane 57. This provides a secure mounting to a structure such as a wall while still allowing free movement of required components. FIG. 4 is a top view of the embodiment of FIG. 3. The exterior pane 65 contains an ultraviolet filtering material to prevent these rays from affecting the stretch lining 71. The exterior pane 65 is sealably fastened to the middle pane 69 forming an insulating chamber 67. The insulating chamber provides a temperature control which is important since the refractory properties of materials vary with temperature. The temperature is maintained at higher than room temperature such as 30 degrees C. because it is easier to only have to heat components than it is to cool components.

As depicted in FIG. 5, extending one set of cylinders including cylinder 79 pushes the middle pane 69 away from the median pane 73. This causes a set of fluid columns between these two panes to fill with fluid. All of these fluid columns are normally covered with a stretch lid 119, lids have been removed in the drawing for illustrative purposes. Half of the columns are filled with air such as fluid column 83 while the other half are filled with a refractive fluid such as fluid column 85. Filling one group of these columns on one side of the median pane 73 will cause the window to refract light in one direction. Filling the other set of the columns on the same side of median pane 73 will cause the light to refract in the other direction. The columns closest to the exterior and interior panes only receive air as a fluid while columns closest to the median pane only receive the refractive fluid when filled. Fluid is pumped into each column through its own respective port; fluid port 91 is one such port. The fluid is pumped from fluid reservoirs 95 and 97, one for each refractive substance. The fluid pump 99 is used for this function.

Similarly, the cylinders between the median pane 73 and the interior pane 75 such as cylinder 81 are used to move these two panes apart. As the panes move apart, fluid is pumped into the each of the fluid columns. Some of the columns are filled with air and some are filled with a refractive fluid according to the direction of the refraction desired. In practice, the dispersion caused by one side of the assembly is offset by the other side of the assembly. This yields the desired amount of refraction within a reduced amount of dispersion.

FIG. 6 further illustrates the double fluid columnar window in the open position. Note that when expanded, fluid column 89 will always be filled with a refractive fluid while fluid column 85 will always be filled with air. Fluid column 87 will sometimes be filled with air to refract in one direction but at other times be filled with a refractive fluid to refract in the opposite direction. The prism angles change as each pane is moved relative to the median pane with angles from 0 to 4 degrees easily possible. Meanwhile the prisms on one side of the median pane do most of the refraction while the prisms on the opposite of the median pane neutralize most of the dispersion.

Stretchable material 109, 111, 120 through which light passes. Transparent latex can be used for this purpose but refractive fluids must be selected carefully such that they do not react with the latex, also the light spectrum passing through the system should be restricted to protect the latex. Fluids such as water and ethyl alcohol will only slowly degrade latex. Table IV illustrates the maximum refraction achievable with ethyl alcohol (solutions in) as one refractive fluid and water as the second refractive fluid.

TABLE IV using ethyl alcohol (solutions in) as the first refractive fluid and water as the second refractive fluid, the maximum refraction achievable while maintaining relative trajectory tolerance of .001 radians across three incident angles (all angles are in radians).

| Incident Angle | 1st Prism Angle | 2nd Prism Angle | Trajectory of 1st wavelength | Trajectory of 2nd wavelength | Relative Trajectory Angle |
|---|---|---|---|---|---|
| 0.52 | 0.33 | −0.77 | 1.03761533671252 | 1.0384533945893 | −0.000838057876778597 |
| 0.32 | 0.33 | −0.77 | 0.586406225916517 | 0.587080939555663 | −0.000674713639146507 |
| 0.02 | 0.33 | −0.77 | 0.21036029125388 | 0.211336999892587 | −0.000976708638706691 |

The LOSLO computer software calculates what the second prism angle must be to offset the dispersion caused by the first prism's angle. The software code developed to achieve this is provided herein as Table VI. Thus the angles can be adjusted instantly through the actuating cylinders. Note that the range of normal ray movement possible with these two fluids is 1.02 rads.

Advantages

Many advantages of the preferred embodiment are present because the user can see many different views from any given vantage point which would otherwise not be possible. Firstly, high refraction is achievable. A range greater than 1.5 radians is possible for a normal ray. Secondly, dispersion can be reduced to a low tolerance level of 0.0001 radians across the visible spectrum. Thirdly, the amount of physical movement to adjust prism angles has been significantly reduced. With miniaturization, movement of less than 1 inch to achieve 1.5 radians of normal ray range is easily possible. Fourthly, this structure is compatible with automobile characteristics. Fifthly, for novelty, the window can be adjusted to alter the color separation caused by dispersion. For example, the user can maximize color separation to provide a uniquely distorted view of outside.

Conclusion, Ramifications, and Scope

Thus the reader will see that the variable view window of this invention provides a highly functional and reliable means to alter the view provided through a window from any given vantage point. This is useful from aesthetic and functional perspectives.

While my above description describes many specifications, these should not be construed as limitations on the scope of the invention, but rather as an exemplification of one preferred embodiment thereof Many other variations are possible. For example prism angles can be actuated by any schemes other than pressure. Window panes referred to herein can be manufactured with many materials, many fluids with refractive indices not included herewith can be used, flexible materials must be matched to fluids such that they don't interact with one another.

TABLE V

Following are the refractive indices of a fraction of the liquids which can function within a liquid prism, as compiled from referenced sources.

| Reference | Temp in K | Material | Wave-length | Ref Index | wv spread | n spread | ratio | weighted ratio |
|---|---|---|---|---|---|---|---|---|
| Nikogosyan | 288.15 | H2O | 0.40466 | 1.34316 | | | | |
| Nikogosyan | 288.15 | H2O | 0.43584 | 1.34062 | | | | |
| Nikogosyan | 288.15 | H2O | 0.4471 | 1.33983 | | | | |
| Nikogosyan | 288.15 | H2O | 0.4713 | 1.33834 | | | | |
| Nikogosyan | 288.15 | H2O | 0.48613 | 1.33753 | | | | |
| Nikogosyan | 288.15 | H2O | 0.5016 | 1.33676 | | | | |
| Nikogosyan | 288.15 | H2O | 0.54607 | 1.33487 | | | | |
| Nikogosyan | 288.15 | H2O | 0.577 | 1.33378 | | | | |
| Nikogosyan | 288.15 | H2O | 0.58756 | 1.33344 | | | | |
| Nikogosyan | 288.15 | H2O | 0.5893 | 1.33339 | | | | |
| Nikogosyan | 288.15 | H2O | 0.65628 | 1.33155 | | | | |
| Nikogosyan | 288.15 | H2O | 0.6678 | 1.33127 | | | | |
| Nikogosyan | 288.15 | H2O | 0.70652 | 1.33041 | | | | |
| Nikogosyan | 293.15 | H2O | 0.40466 | 1.34274 | | | | |
| Nikogosyan | 293.15 | H2O | 0.43584 | 1.34021 | | | | |
| Nikogosyan | 293.15 | H2O | 0.4471 | 1.33942 | | | | |
| Nikogosyan | 293.15 | H2O | 0.4713 | 1.33793 | | | | |
| Nikogosyan | 293.15 | H2O | 0.48613 | 1.33712 | | | | |
| Nikogosyan | 293.15 | H2O | 0.5016 | 1.33635 | | | | |
| Nikogosyan | 293.15 | H2O | 0.54607 | 1.33447 | | | | |
| Nikogosyan | 293.15 | H2O | 0.577 | 1.33338 | | | | |
| Nikogosyan | 293.15 | H2O | 0.58756 | 1.33304 | | | | |
| Nikogosyan | 293.15 | H2O | 0.5893 | 1.33299 | | | | |
| Nikogosyan | 293.15 | H2O | 0.65628 | 1.33115 | | | | |
| Nikogosyan | 293.15 | H2O | 0.6678 | 1.33088 | −0.30186 | 0.0127200000 000001 | −0.042138739 8131586 | −31.58328905 66036 |
| Nikogosyan | 293.15 | H2O | 0.70652 | 1.33002 | | | | |
| Nikogosyan | 298.15 | H2O | 0.40466 | 1.34239 | | | | |
| Nikogosyan | 298.15 | H2O | 0.43584 | 1.33971 | | | | |
| Nikogosyan | 298.15 | H2O | 0.4471 | 1.33892 | | | | |
| Nikogosyan | 298.15 | H2O | 0.4713 | 1.33743 | | | | |
| Nikogosyan | 298.15 | H2O | 0.48613 | 1.33663 | | | | |
| Nikogosyan | 298.15 | H2O | 0.5016 | 1.33586 | | | | |
| Nikogosyan | 298.15 | H2O | 0.54607 | 1.33398 | | | | |
| Nikogosyan | 298.15 | H2O | 0.577 | 1.33289 | | | | |
| Nikogosyan | 298.15 | H2O | 0.58756 | 1.33256 | | | | |
| Nikogosyan | 298.15 | H2O | 0.5893 | 1.3325 | | | | |
| Nikogosyan | 298.15 | H2O | 0.65628 | 1.33067 | | | | |
| Nikogosyan | 298.15 | H2O | 0.6678 | 1.3304 | | | | |
| Nikogosyan | 298.15 | H2O | 0.70652 | 1.32954 | | | | |
| Nikogosyan | 303.15 | H2O | 0.40466 | 1.34166 | | | | |
| Nikogosyan | 303.15 | H2O | 0.43584 | 1.33913 | | | | |
| Nikogosyan | 303.15 | H2O | 0.4471 | 1.33835 | | | | |
| Nikogosyan | 303.15 | H2O | 0.4713 | 1.33686 | | | | |
| Nikogosyan | 303.15 | H2O | 0.48613 | 1.33606 | | | | |
| Nikogosyan | 303.15 | H2O | 0.5016 | 1.33529 | | | | |
| Nikogosyan | 303.15 | H2O | 0.54607 | 1.33341 | | | | |
| Nikogosyan | 303.15 | H2O | 0.577 | 1.33233 | | | | |
| Nikogosyan | 303.15 | H2O | 0.58756 | 1.33199 | | | | |
| Nikogosyan | 303.15 | H2O | 0.5893 | 1.33194 | | | | |
| Nikogosyan | 303.15 | H2O | 0.6678 | 1.32984 | | | | |
| Nikogosyan | 303.15 | H2O | 0.70652 | 1.32899 | | | | |
| Nikogosyan | 288.15 | methanol | 0.48613 | 1.3346 | | | | |
| Nikogosyan | 288.15 | methanol | 0.65628 | 1.32897 | −0.17015 | 0.0056300000 0000002 | −0.033088451 3664415 | −40.16416438 72112 |
| Nikogosyan | 293.15 | ethenol | 0.40466 | 1.3729 | | | | |
| Nikogosyan | 293.15 | ethenol | 0.65628 | 1.3591 | −0.25162 | 0.0138 | −0.054844606 9469837 | −24.78092333 33333 |
| Nikogosyan | 293.15 | ethylene glycol | 0.43584 | 1.44 | | | | |
| Nikogosyan | 293.15 | ethylene glycol | 0.65628 | 1.4296 | −0.22044 | 0.0104 | −0.047178370 5316638 | −30.30202153 84616 |
| Nikogosyan | 293.15 | glycerol (glycerine) | 0.48613 | 1.4795 | | | | |
| Nikogosyan | 293.15 | glycerol (glycerine) | 0.65628 | 1.4721 | −0.17015 | 0.0074000000 0000007 | −0.043491037 3200122 | −33.84835337 8378 |
| Nikogosyan | 293.15 | hexane | 0.48613 | 1.3795 | | | | |
| Nikogosyan | 293.15 | hexane | 0.65628 | 1.373 | −0.17015 | 0.0064999999 | −0.038201586 | −35.94091538 |

TABLE V-continued

Following are the refractive indices of a fraction of the liquids which can function within a liquid prism, as compiled from referenced sources.

| Reference | Temp in K | Material | Wave-length | Ref Index | wv spread | n spread | ratio | weighted ratio |
|---|---|---|---|---|---|---|---|---|
| | | | | | | 9999995 | 8351452 | 46157 |
| Nikogosyan | 293.15 | cyclohexane | 0.43584 | 1.4335 | | | | |
| Nikogosyan | 293.15 | cyclohexane | 0.65628 | 1.42405 | −0.22044 | 0.0094499999 9999996 | −0.042868807 8388675 | −33.21879174 60319 |
| Nikogosyan | 293.15 | dichloroethane | 0.48613 | 1.45024 | | | | |
| Nikogosyan | 293.15 | dichloroethane | 0.65628 | 1.44189 | −0.17015 | 0.0083500000 0000008 | −0.049074346 1651489 | −29.38174652 69458 |
| Nikogosyan | 293.15 | chloroform | 0.43584 | 1.4546 | | | | |
| Nikogosyan | 293.15 | chloroform | 0.65628 | 1.443 | −0.22044 | 0.0115999999 999998 | −0.052622028 6699321 | −27.42197586 20694 |
| Nikogosyan | 293.15 | benzene | 0.40466 | 1.5318 | | | | |
| Nikogosyan | 293.15 | benzene | 0.65628 | 1.49663 | −0.25162 | 0.0351700000 000001 | −0.139774262 777204 | −10.70747911 85669 |
| Nikogosyan | 293.15 | nitrobenzene | 0.48613 | 1.57124 | | | | |
| Nikogosyan | 293.15 | nitrobenzene | 0.65628 | 1.54593 | −0.17015 | 0.0253099999 999999 | −0.148751101 968851 | −10.39272973 13315 |
| Nikogosyan | 293.15 | toluene | 0.40466 | 1.52612 | | | | |
| Nikogosyan | 293.15 | toluene | 0.70652 | 1.489795 | −0.30186 | 0.0363249999 999999 | −0.120337242 430265 | −12.38016569 0296 |
| Nikogosyan | 288.15 | carbon tetrachloride | 0.48613 | 1.4697 | | | | |
| Nikogosyan | 288.15 | carbon tetrachloride | 0.65628 | −0.46005 | −0.17015 | 0.0096499999 9999994 | −0.056714663 5321771 | −25.74378316 06219 |
| Nikogosyan | 288.15 | acetone | 0.48613 | 1.36634 | | | | |
| Nikogosyan | 288.15 | acetone | 0.65628 | 1.35959 | −0.17015 | 0.0067500000 0000003 | −0.039670878 6364974 | −34.27173903 70369 |
| Nikogosyan | 288.15 | acetic acid | 0.48613 | 1.37851 | | | | |
| Nikogosyan | 288.15 | acetic acid | 0.65628 | 1.37165 | −0.17015 | 0.0068599999 9999987 | −0.040317367 0290912 | −34.02131887 75517 |
| Nikogosyan | 293.15 | dioxane | 0.43584 | 1.4293 | | | | |
| Nikogosyan | 293.15 | dioxane | 0.65628 | 1.4202 | −0.22044 | 0.0091000000 0000011 | −0.041281074 2152065 | −34.40317450 54941 |
| Nikogosyan | 293.15 | carbon disulfide | 0.44466 | 1.6934 | | | | |
| Nikogosyan | 293.15 | carbon disulfide | 0.65628 | 1.6182 | −0.25162 | 0.0751999999 999999 | −0.298863365 392258 | −5.414514414 89362 |
| Marsh | 293 | silicone oil | 0.43584 | 1.53751 | | | | |
| Marsh | 293 | silicone oil | 0.6678 | 1.51279 | −0.23196 | 0.0247199999 999999 | −0.106570098 292809 | −14.19525762 13593 |
| Marsh | 293 | trimethylpentane | 0.43583 | 1.40029 | | | | |
| Marsh | 293 | trimethylpentane | 0.66781 | 1.38916 | −0.23198 | 0.0111300000 000001 | −0.047978273 9891374 | −28.95393861 6352 |
| Marsh | 293 | hexadecane | 0.43583 | 1.44419 | | | | |
| | | | | | | 000007 | 7590314 | 31685 |
| Marsh | 293 | trans-bicyclodecane | 0.43583 | 1.48011 | | | | |
| Marsh | 293 | trans-bicyclodecane | 0.66781 | 1.46654 | −0.23198 | 0.0135700000 000001 | −0.058496422 1053543 | −25.07059316 13853 |
| Marsh | 293 | methynaphthalene | 0.48613 | 1.63958 | | | | |
| Marsh | 293 | methynaphthalene | 0.66781 | 1.60828 | −0.18168 | 0.0313000000 000001 | −0.172280933 509468 | −9.335217584 66451 |
| Marsh | 293 | methylcyclohexane | 0.43583 | 1.43269 | | | | |
| Marsh | 293 | methylcyclohexane | 0.66781 | 1.42064 | −0.23198 | 0.0120500000 000001 | −0.051944133 1149242 | −27.34938317 01242 |
| Gray, D.E. | 293 | Acetaldehyde | 0.486 | 1.3359 | | | | |
| Gray, D.E. | 293 | Acetaldehyde | 0.589 | 1.3316 | | | | |
| Gray, D.E. | 293 | Acetaldehyde | 0.656 | 1.3298 | −0.17 | 0.0060999999 9999999 | −0.035882352 9411764 | −37.06 |
| Gray, D.E. | 293 | acetone | 0.486 | 1.3639 | | | | |
| Gray, D.E. | 293 | acetone | 0.589 | 1.3593 | | | | |
| Gray, D.E. | 293 | acetone | 0.656 | 1.3573 | −0.17 | 0.0065999999 9999994 | −0.038823529 4117643 | −34.96075757 57579 |
| Gray, D.E. | 293 | aniline | 0.486 | 1.6041 | | | | |
| Gray, D.E. | 293 | aniline | 0.589 | 1.5863 | | | | |
| Gray, D.E. | 293 | aniline | 0.656 | 1.5793 | −0.17 | 0.0248000000 000002 | −0.145882352 941177 | −10.82584677 41935 |
| Gray, D.E. | 293 | methyl alcohol | 0.486 | 1.3331 | | | | |
| Gray, D.E. | 293 | methyl alcohol | 0.589 | 1.329 | | | | |
| Gray, D.E. | 293 | methyl alcohol | 0.656 | 1.3277 | −0.17 | 0.0053999999 9999985 | −0.031764705 8823521 | −41.79796296 29641 |
| Gray, D.E. | 273 | ethyl alcohol | 0.486 | 1.3739 | | | | |
| Gray, D.E. | 273 | ethyl alcohol | 0.589 | 1.3695 | | | | |
| Gray, D.E. | 273 | ethyl alcohol | 0.656 | 1.3677 | −0.17 | 0.0061999999 9999998 | −0.036470588 235294 | −37.50145161 29033 |
| Gray, D.E. | 293 | ethyl alcohol | 0.486 | 1.3666 | | | | |
| Gray, D.E. | 293 | ethyl alcohol | 0.589 | 1.3618 | | | | |

TABLE V-continued

Following are the refractive indices of a fraction of the liquids which can function within a liquid prism, as compiled from referenced sources.

| Reference | Temp in K | Material | Wave-length | Ref Index | wv spread | n spread | ratio | weighted ratio |
|---|---|---|---|---|---|---|---|---|
| Gray, D.E. | 293 | ethyl alcohol | 0.656 | 1.3605 | −0.17 | 0.00609999999999999 | −0.0358823529411764 | −37.9155737704918 |
| Gray, D.E. | 293 | n-propyl alcohol | 0.486 | 1.3901 | | | | |
| Gray, D.E. | 293 | n-propyl alcohol | 0.589 | 1.3854 | | | | |
| Gray, D.E. | 293 | n-propyl alcohol | 0.656 | 1.3834 | −0.17 | 0.00669999999999993 | −0.0394117647058819 | −35.1011940298511 |
| Gray, D.E. | 293 | benzene | 0.486 | 1.5132 | | | | |
| Gray, D.E. | 293 | benzene | 0.589 | 1.5012 | | | | |
| Gray, D.E. | 293 | benzene | 0.656 | 1.4965 | −0.17 | 0.0167000000000002 | −0.0982352941117648 | −15.2338323353292 |
| Gray, D.E. | 293 | bromnaphthalene | 0.486 | 1.6819 | | | | |
| Gray, D.E. | 293 | bromnaphthalene | 0.589 | 1.6582 | | | | |
| Gray, D.E. | 293 | bromnaphthalene | 0.656 | 1.6495 | −0.17 | 0.0324 | −0.190588235294118 | −8.65478395061729 |
| Gray, D.E. | 273 | carbon disulfide | 0.486 | 1.6688 | | | | |
| Gray, D.E. | 273 | carbon disulfide | 0.589 | 1.6433 | | | | |
| Gray, D.E. | 273 | carbon disulfide | 0.656 | 1.6336 | −0.17 | 0.0352000000000001 | −0.207058823529412 | −7.88954545454543 |
| Gray, D.E. | 293 | carbon disulfide | 0.486 | 1.6523 | | | | |
| Gray, D.E. | 293 | carbon disulfide | 0.589 | 1.6276 | | | | |
| Gray, D.E. | 293 | carbon disulfide | 0.656 | 1.6182 | −0.17 | 0.0341 | −0.200588235294118 | −8.06727272727273 |
| Gray, D.E. | 293 | carbon tetrachloride | 0.486 | 1.4676 | | | | |
| Gray, D.E. | 293 | carbon tetrachloride | 0.589 | 1.4607 | | | | |
| Gray, D.E. | 293 | carbon tetrachloride | 0.656 | 1.4579 | −0.17 | 0.00970000000000004 | −0.0570588235294112 | −25.5508247422679 |
| Gray, D.E. | 288.1 | anise seed oil | 0.486 | 1.5743 | | | | |
| Gray, D.E. | 288.1 | anise seed oil | 0.589 | 1.5572 | | | | |
| Gray, D.E. | 288.1 | anise seed oil | 0.656 | 1.5508 | −0.17 | 0.0235000000000001 | −0.138235294117647 | −11.2185531914893 |
| Gray, D.E. | 274.4 | anise oil | 0.486 | 1.5647 | | | | |
| Gray, D.E. | 274.4 | anise oil | 0.589 | 1.5475 | | | | |
| Gray, D.E. | 274.4 | anise oil | 0.656 | 1.541 | −0.17 | 0.0237000000000001 | −0.139411764705883 | −11.0535864978903 |
| Gray, D.E. | 293 | bitter almond oil | 0.486 | 1.5623 | | | | |
| Gray, D.E. | 293 | bitter almond oil | 0.589 | | | | | |
| Gray, D.E. | 293 | bitter almond oil | 0.656 | 1.5391 | −0.17 | 0.0232000000000001 | −0.136470588235295 | −11.2778879310344 |
| Gray, D.E. | 283 | cassia oil | 0.486 | 1.6389 | | | | |
| Gray, D.E. | 283 | cassia oil | 0.589 | 1.6104 | | | | |
| Gray, D.E. | 283 | cassia oil | 0.656 | 1.6007 | −0.17 | 0.0382 | −0.224705882352941 | −7.12353403141361 |
| Gray, D.E. | 293.5 | casia oil | 0.486 | 1.6314 | | | | |
| Gray, D.E. | 293.5 | casia oil | 0.589 | 1.6026 | | | | |
| Gray, D.E. | 293.5 | casia oil | 0.656 | 1.593 | −0.17 | 0.0384 | −0.225882352941176 | −7.05234375 |
| Gray, D.E. | 296.5 | cinnamon oil | 0.486 | 1.6508 | | | | |
| Gray, D.E. | 296.5 | cinnamon oil | 0.589 | 1.6188 | | | | |
| Gray, D.E. | 296.5 | cinnamon oil | 0.656 | 1.6077 | −0.17 | 0.0431000000000001 | −0.253529411764707 | −6.34127610208815 |
| Gray, D.E. | 273 | olive oil | 0.486 | 1.4825 | | | | |
| Gray, D.E. | 273 | olive oil | 0.589 | 1.4763 | | | | |
| Gray, D.E. | 273 | olive oil | 0.656 | 1.4738 | −0.17 | 0.00869999999999993 | −0.0511764705882349 | −28.7983908045979 |
| Gray, D.E. | 273 | rock oil | 0.486 | 1.4644 | | | | |
| Gray, D.E. | 273 | rock oil | 0.589 | 1.4573 | | | | |
| Gray, D.E. | 273 | rock oil | 0.656 | 1.4545 | −0.17 | 0.00990000000000002 | −0.0582352941176472 | −24.9762626262626 |
| Gray, D.E. | 283.6 | turpentine oil | 0.486 | 1.4817 | | | | |
| Gray, D.E. | 283.6 | turpentine oil | 0.589 | 1.4744 | | | | |
| Gray, D.E. | 283.6 | turpentine oil | 0.656 | 1.4715 | −0.17 | 00102 | −0.0599999999999999 | −24.525 |
| Gray, D.E. | 293.7 | turpentine oil | 0.486 | 1.4793 | | | | |
| Gray, D.E. | 293.7 | turpentine oil | 0.589 | 1.4721 | | | | |
| Gray, D.E. | 293.7 | turpentine oil | 0.656 | 1.4692 | −0.17 | 0.0101 | −0.0594117647058823 | −24.7291089108911 |
| Gray, D.E. | 288.7 | pentane | 0.486 | 1.361 | | | | |
| Gray, D.E. | 288.7 | pentane | 0.589 | 1.3581 | | | | |
| Gray, D.E. | 288.7 | pentane | 0.656 | 1.357 | −0.17 | 0.004 | −0.0235294117647059 | −57.6725 |
| Gray, D.E. | 313.6 | phenol | 0.486 | 1.5558 | | | | |
| Gray, D.E. | 313.6 | phenol | 0.589 | 1.5425 | | | | |
| Gray, D.E. | 313.6 | phenol | 0.656 | 1.5369 | −0.17 | 0.0189000000000 | −0.111176470 | −13.82396825 |

TABLE V-continued

Following are the refractive indices of a fraction of the liquids which can function within a liquid prism, as compiled from referenced sources.

| Reference | Temp in K | Material | Wave-length | Ref Index | wv spread | n spread | ratio | weighted ratio |
|---|---|---|---|---|---|---|---|---|
| Gray, D.E. | 355.7 | phenol | 0.486 | 1.5356 | | 000001 | 588236 | 39682 |
| Gray, D.E. | 355.7 | phenol | 0.589 | | | | | |
| Gray, D.E. | 355.7 | phenol | 0.656 | 1.5174 | −0.17 | 0.0182 | −0.107058823 529412 | −14.17351648 35165 |
| Gray, D.E. | 289.6 | styrene | 0.486 | 1.5659 | | | | |
| Gray, D.E. | 289.6 | styrene | 0.589 | 1.5485 | | | | |
| Gray, D.E. | 289.6 | styrene | 0.656 | 1.5419 | −0.17 | 0.024 | −0.141176470 588235 | −10.92179166 66667 |
| Gray, D.E. | 293 | thymol | 0.486 | 1.5386 | | | | |
| Gray, D.E. | 293 | thymol | 0.589 | | | | 4705884 | 20253 |
| Gray, D.E. | 293 | toluene | 0.486 | 1.507 | | | | |
| Gray, D.E. | 293 | toluene | 0.589 | 1.4955 | | | | |
| Gray, D.E. | 293 | toluene | 0.656 | 1.4911 | 0.17 | 0.0158999999 999998 | −0.093529411 7647047 | −15.94257861 63524 |
| Gray, D.E. | 300.05 | Ammonium Chloride | 0.486 | 1.38473 | | | | |
| Gray, D.E. | 300.05 | Ammonium Chloride | 0.589 | 1.37936 | | | | |
| Gray, D.E. | 300.05 | Ammonium Chloride | 0.656 | 1.37703 | −0.17 | 0.0077000000 0000004 | −0.045294117 6470591 | −30.40196103 889609 |
| Gray, D.E. | 302.75 | Ammonium Chloride | 0.486 | 1.35515 | | | | |
| Gray, D.E. | 302.75 | Ammonium Chloride | 0.589 | 1.3505 | | | | |
| Gray, D.E. | 302.75 | Ammonium Chloride | 0.656 | 1.3485 | −0.17 | 0.0066500000 0000005 | −0.039117647 0588238 | −34.47293233 08268 |
| Gray, D.E. | 298.65 | Calcium chloride | 0.486 | 1.44938 | | | | |
| Gray, D.E. | 298.65 | Calcium chloride | 0.589 | 1.44279 | | | | |
| Gray, D.E. | 298.65 | Calcium chloride | 0.656 | 1.44 | −0.17 | 0.0093799999 9999994 | −0.055176470 588235 | −26.09808102 34543 |
| Gray, D.E. | 299.9 | Calcium chloride | 0.486 | 1.40206 | | | | |
| Gray, D.E. | 299.9 | Calcium chloride | 0.589 | 1.39652 | | | | |
| Gray, D.E. | 299.9 | Calcium chloride | 0.656 | 1.39411 | −0.17 | 0.0079500000 0000012 | −0.046764705 8823537 | −29.81115723 27039 |
| Gray, D.E. | 298.8 | Calcium chloride | 0.486 | 1.37876 | | | | |
| Gray, D.E. | 298.8 | Calcium chloride | 0.589 | 1.37369 | | | | |
| Gray, D.E. | 298.8 | Calcium chloride | 0.656 | 1.37152 | −0.17 | 0.0072399999 9999991 | −0.042588235 2941171 | −32.20419889 5028 |
| Gray, D.E. | 293.75 | Hydrochloric acid | 0.486 | 1.41774 | | | | |
| Gray, D.E. | 293.75 | Hydrochloric acid | 0.589 | 1.41109 | | | | |
| Gray, D.E. | 293.75 | Hydrochloric acid | 0.656 | 1.40817 | −0.17 | 0.0095700000 0000008 | −0.056294117 6470593 | −25.01451410 65829 |
| Gray, D.E. | 291.75 | Nitric acid | 0.486 | 1.40857 | | | | |
| Gray, D.E. | 291.75 | Nitric acid | 0.589 | 1.40181 | | | | |
| Gray, D.E. | 291.75 | Nitric acid | 0.656 | 1.39893 | −0.17 | 0.0096400000 0000009 | −0.056705882 3529417 | −24.66992738 58919 |
| Gray, D.E. | 284 | Potash (caustic) | 0.486 | 1.40808 | | | | |
| Gray, D.E. | 284 | Potash (caustic) | 0.589 | 1.40281 | | | | |
| Gray, D.E. | 284 | Potash (caustic) | 0.656 | 1.40052 | 0.17 | 0.0075600000 0000001 | −0.044470588 2352942 | −31.49317460 31746 |
| Gray, D.E. | 284 | Potassium cloride | 0.486 | 1.34719 | | | | |
| Gray, D.E. | 284 | Potassium cloride | 0.589 | 1.34278 | | | | |
| Gray, D.E. | 284 | Potassium cloride | 0.589 | 1.34087 | −0.103 | 0 0063200000 000001 | −0.061359223 3009719 | −21.85278639 24047 |
| Gray, D.E. | 284 | Potassium cloride | 0.486 | 1.35645 | | | | |
| Gray, D.E. | 284 | Potassium cloride | 0.589 | 1.35179 | | | | |
| Gray, D.E. | 284 | Potassium cloride | 0.656 | 1.34982 | −0.17 | 0.0066299999 9999991 | −0.038999999 9999995 | −34.61076923 07697 |
| Gray, D.E. | 284 | Potassium cloride | 0.486 | 1.36512 | | | | |
| Gray, D.E. | 284 | Potassium cloride | 0.589 | 1.36029 | | | | |
| Gray, D.E. | 284 | Potassium cloride | 0.656 | 1.35831 | −0.17 | 0.0068099999 9999998 | −0.040058823 5294117 | −33.90788546 25552 |
| Gray, D.E. | 294.6 | Soda (caustic) | 0.486 | 1.41936 | | | | |
| Gray, D.E. | 294.6 | Soda(caustic) | 0.589 | 1.41334 | | | | |
| Gray, D.E. | 294.6 | Soda (caustic) | 0.656 | 1.41071 | −0.17 | 0 0086500000 0000005 | −0.050882352 9411767 | −27.72493641 61848 |
| Gray, D.E. | 291.07 | Sodium chloride | 0.486 | 1.38322 | | | | |
| Gray, D.E. | 291.07 | Sodium chloride | 0.589 | 1.37789 | | | | |
| Gray, D.E. | 291.07 | Sodium chloride | 0.656 | 1.37562 | −0.17 | 0.0075999999 9999983 | −0.044705882 3529402 | −30.77044736 84218 |
| Gray, D.E. | 291.07 | Sodium chloride | 0.486 | 1.36442 | | | | |
| Gray, D.E. | 291.07 | Sodium chloride | 0.656 | 1.35751 | −0.17 | 0.0069099999 9999997 | −0.040647058 8235292 | −33.39749638 20551 |
| Gray, D.E. | 291.07 | Sodium chloride | 0.486 | 1.34628 | | | | |
| Gray, D.E. | 291.07 | Sodium chloride | 0.589 | 1.34191 | | | | |

TABLE V-continued

Following are the refractive indices of a fraction of the liquids which can function within a liquid prism, as compiled from referenced sources.

| Reference | Temp in K | Material | Wave-length | Ref Index | wv spread | n spread | ratio | weighted ratio |
|---|---|---|---|---|---|---|---|---|
| Gray, D.E. | 291.07 | Sodium chloride | 0.656 | 1.34 | −0.17 | 0.00627999999999984 | −0.0369411764705873 | −36.2738853503194 |
| Gray, D.E. | 295.8 | Sodium nitrate | 0.486 | 1.39134 | | | | |
| Gray, D.E. | 295.8 | Sodium nitrate | 0.589 | 1.38535 | | | | |
| Gray, D.E. | 295.8 | Sodium nitrate | 0.656 | 1.38283 | −0.17 | 0.00851000000000002 | −0.0500588235294119 | −27.6241010575793 |
| Gray, D.E. | 293.3 | Sulfuric acid | 0.486 | 1.44168 | | | | |
| Gray, D.E. | 293.3 | Sulfuric acid | 0.589 | 1.43669 | | | | |
| Gray, D.E. | 293.3 | Sulfuric acid | 0.656 | 1.43444 | −0.17 | 0.00724000000000014 | −0.0425882352941184 | −33.6816022099441 |
| Gray, D.E. | 293.3 | Sulfuric acid | 0.486 | 1.42967 | | | | |
| Gray, D.E. | 293.3 | Sulfuric acid | 0.589 | 1.42466 | | | | |
| Gray, D.E. | 293.3 | Sulfuric acid | 0.656 | 1.42227 | −0.17 | 0.00740000000000007 | −0.0435294117647063 | −32.67377027027 |
| Gray, D.E. | 293.3 | Sulfuric acid | 0.486 | 1.37468 | | | | |
| Gray, D.E. | 293.3 | Sulfuric acid | 0.589 | 1.37009 | | | | |
| Gray, D.E. | 293.3 | Sulfuric acid | 0.656 | 1.36793 | −0.17 | 0.00674999999999981 | −0.0397058823529401 | −34.4515703703713 |
| Gray, D.E. | 293.3 | Sulfuric acid | 0.486 | 1.34285 | | | | |
| Gray, D.E. | 293.3 | Sulfuric acid | 0.589 | 1.33862 | | | | |
| Gray, D.E. | 293.3 | Sulfuric acid | 0.656 | 1.33663 | −0.17 | 0.00622000000000011 | −0.0365882352941183 | −36.5316881028932 |
| Gray, D.E. | 299.9 | Zinc chloride | 0.486 | 1.40797 | | | | |
| Gray, D.E. | 299.9 | Zinc chloride | 0.589 | 1.40222 | | | | |
| Gray, D.E. | 299.9 | Zinc chloride | 0.656 | 1.39977 | −0.17 | 0.00819999999999999 | −0.048235294117647 | −29.0196219512196 |
| Gray, D.E. | 296.4 | Zinc chloride | 0.486 | 1.38026 | | | | |
| Gray, D.E. | 296.4 | Zinc chloride | 0.589 | 1.37515 | | | | |
| Gray, D.E. | 296.4 | Zinc chloride | 0.656 | 1.37292 | −0.17 | 0.00734000000000012 | −0.043176470588236 | −31.7978746594 |
| Gray, D.E. | 298.5 | Ethyl alcohol | 0.486 | 1.36395 | | | | |
| Gray, D.E. | 298.5 | Ethyl alcohol | 0.589 | 1.35971 | | | | |
| Gray, D.E. | 298.5 | Ethyl alcohol | 0.656 | 1.35971 | −0.17 | 0.00424000000000002 | −0.0249411764705884 | −54.5166745283016 |
| Gray, D.E. | 300.6 | Ethyl alcohol | 0.486 | 1.35986 | | | | |
| Gray, D.E. | 300.6 | Ethyl alcohol | 0.589 | 1.35556 | | | | |
| Gray, D.E. | 300.6 | Ethyl alcohol | 0.656 | 1.35372 | −0.17 | 0.00614000000000003 | −0.0361176470588237 | −37.4808469055373 |
| Gray, D.E. | 289 | Fuchsin (nearly saturated | 0.486 | 1.3918 | | | | |
| Gray, D.E. | 289 | Fuchsin (nearly saturated | 0.589 | 1.398 | | | | |
| Gray, D.E. | 289 | Fuchsin (nearly saturated | 0.656 | 1.361 | −0.17 | 0.0307999999999999 | −0.181176470588235 | −7.512012987013 |
| Gray, D.E. | 289 | Cyanin (saturated) | 0.486 | 1.3831 | | | | |
| Gray, D.E. | 289 | Cyanin (saturated) | 0.589 | | | | | |
| Gray, D.E. | 289 | Cyanin (saturated) | 0.656 | 1.3705 | −0.17 | 0.0125999999999999 | −0.0741176470588232 | −18.4908730158731 |
| Gray, D.E. | 293 | chinolin | 0.589 | 1.6245 | | | | |
| Gray, D.E. | 293 | chinolin | 0.656 | 1.6161 | −0.17 | 0.0308999999999999 | −0.181764705882352 | −8.89116504854371 |
| Gray, D.E. | 293 | chloral | 0.486 | 1.4624 | | | | |
| Gray, D.E. | 293 | chloral | 0.589 | 1.4557 | | | | |
| Gray, D.E. | 293 | chloral | 0.656 | 1.453 | −0.17 | 0.00939999999999985 | −0.0552941176470579 | −26.2776595744685 |
| Gray, D.E. | 293 | chloroform | 0.486 | 1.453 | | | | |
| Gray, D.E. | 293 | chloroform | 0.589 | 1.4467 | | | | |
| Gray, D.E. | 293 | chloroform | 0.656 | 1.4443 | −0.17 | 0.00870000000000015 | −0.0511764705882362 | −28.221954022988 |
| Gray, D.E. | 287.9 | decane | 0.486 | 1.416 | | | | |
| Gray, D.E. | 287.9 | decane | 0.589 | 1.4108 | | | | |
| Gray, D.E. | 287.9 | decane | 0.656 | 1.4088 | −0.17 | 0.00719999999999987 | −0.0423529411764698 | −33.2633333333339 |
| Gray, D.E. | 293 | ether, ethyl | 0.486 | 1.3576 | | | | |
| Gray, D.E. | 293 | ether, ethyl | 0.589 | 1.3538 | | | | |
| Gray, D.E. | 293 | ether, ethyl | 0.656 | 1.3515 | −0.17 | 0.00609999999999999 | −0.0358823529411764 | −37.6647540983607 |
| Gray, D.E. | 293 | ethyl nitrate | 0.486 | 1.392 | | | | |
| Gray, D.E. | 293 | ethyl nitrate | 0.589 | 1.3853 | | | | |
| Gray, D.E. | 293 | ethyl nitrate | 0.656 | 1.383 | −0.17 | 0.00899999999999999 | −0.0529411764705876 | −26.1233333333336 |
| Gray, D.E. | 293 | formic acid | 0.486 | 1.3764 | | | | |
| Gray, D.E. | 293 | formic acid | 0.589 | 1.3714 | | | | |

TABLE V-continued

Following are the refractive indices of a fraction of the liquids which can function within a liquid prism, as compiled from referenced sources.

| Reference | Temp in K | Material | Wave-length | Ref Index | wv spread | n spread | ratio | weighted ratio |
|---|---|---|---|---|---|---|---|---|
| Gray, D.E. | 293 | formic acid | 0.656 | 1.3693 | −0.17 | 0.00710000000000011 | −0.0417647058823536 | −32.7860563380277 |
| Gray, D.E. | 293 | glycerine | 0.486 | 1.4784 | | | | |
| Gray, D.E. | 293 | glycerine | 0.589 | 1.473 | | | | |
| Gray, D.E. | 293 | glycerine | 0.656 | 1.4706 | −0.17 | 0.00780000000000003 | −0.0458823529411766 | −32.0515384615384 |
| Gray, D.E. | 293 | hexane | 0.486 | 1.3799 | | | | |
| Gray, D.E. | 293 | hexane | 0.589 | 1.3754 | | | | |
| Gray, D.E. | 293 | hexane | 0.589 | 1.3734 | −0.103 | 0.00649999999999995 | −0.0631067961165044 | −21.7631076923079 |
| Gray, D.E. | 296.3 | hexylene | 0.486 | 1.4007 | | | | |
| Gray, D.E. | 296.3 | hexylene | 0.589 | 1.3945 | | | | |
| Gray, D.E. | 296.3 | hexylene | 0.656 | 1.392 | −0.17 | 0.00870000000000015 | −0.0511764705882362 | −27.1999999999995 |
| Gray, D.E. | 293 | methylene iodide | 0.486 | 1.7692 | | | | |
| Gray, D.E. | 293 | methylene iodide | 0.589 | 1.7417 | | | | |
| Gray, D.E. | 293 | methylene iodide | 0.656 | 1.732 | −0.17 | 0.0372000000000001 | −0.218823529411765 | −7.91505376344084 |
| Gray, D.E. | 371.6 | naphthalene | 0.486 | 1.6031 | | | | |
| Gray, D.E. | 371.6 | naphthalene | 0.589 | 1.5823 | | | | |
| Gray, D.E. | 371.6 | naphthalene | 0.656 | 1.5746 | −0.17 | 0.0285 | −0.167647058823529 | −9.39235087719299 |
| Gray, D.E. | 295.4 | nicotine | 0.486 | 1.5239 | | | | |
| Gray, D.E. | 295.4 | nicotine | 0.589 | 1.5239 | | | | |
| Gray, D.E. | 295.4 | nicotine | 0.656 | 1.5198 | −0.17 | 0.00409999999999999 | −0.0241176470588235 | −63.0160975609758 |
| Gray, D.E. | 288.1 | octane | 0.486 | 1.4046 | | | | |
| Gray, D.E. | 288.1 | octane | 0.589 | 1.4007 | | | | |
| Gray, D.E. | 288.1 | octane | 0.656 | 1.3987 | −0.17 | 0.00590000000000002 | −0.0347058823529413 | −10.3015254237287 |
| Gray, D.E. | 273 | almond oil | 0.486 | 1.4847 | | | | |
| Gray, D.E. | 273 | almond oil | 0.589 | 1.4782 | | | | |
| Gray, D.E. | 273 | almond oil | 0.656 | 1.4755 | −0.17 | 0.0091999999999 | −0.054117647 | −27.26467391 |

VI - LOSLO software code written in C++ controls the two prism angles to minimize dispersion.

```
//----------------------------------------------------
#include <vcl.h>
#include <math.h>
#pragma hdrstop
#include "Thread.h"
#include "Convert.h"
#include "OutpuT.h"
#include "Imput.h"
#pragma package(smart_init)
double convert(AnsiString);
int p;
//----------------------------------------------------
void __fastcall TMain::Progress( )
{
    MainForm->ProgressBar->Position = p;
}
//----------------------------------------------------
__fastcall TMain::TMain(bool CreateSuspended):
TThread(CreateSuspended)
{
    Priority = tpNormal;
    FreeOnTerminate = true;
}
//----------------------------------------------------
void __fastcall TMain::Execute( )
{
    double Inc1 = convert(InputForm->TInc1->Text);
    if (InputForm->Inc1N->Checked == true) Inc1 = Inc1 * −1;
    double Inc2 = convert(InputForm->TInc2->Text);
    if (InputForm->Inc2N->Checked == true) Inc2 = Inc2 * −1;
    double Inc3 = convert(InputForm->TInc3->Text);
    if (InputForm->Inc3N->Checked == true) Inc3 = Inc3 * −1;
    double Mat2L = convert(InputForm->TMat2L->Text);
    double Mat2H = convert(InputForm->TMat2H->Text);
    double Off2B = convert(InputForm->TOff2B->Text);
    double Off2E = convert(InputForm->TOff2E->Text);
    double Off2I = convert(InputForm->TOff2I->Text);
    double Off3B = convert(InputForm->TOff3B->Text);
    if (InputForm->Off3BN->Checked == true) Off3B = Off3B * −1;
    double Off3E = convert(InputForm->TOff3E->Text);
    if (InputForm->Off3EN->Checked == true) Off3E = Off3E * −1;
    double Off3I = convert(InputForm->TOff3I->Text);
    double Mat3B = convert(InputForm->TMat3B->Text);
    double Mat3E = convert(InputForm->TMat3E->Text);
    double Mat3I = convert(InputForm->TMat3I->Text);
    double Tol1 = convert(InputForm->TTol1->Text);
    double Tol2 = convert(InputForm->TTol2->Text);
    double Tol3 = convert(InputForm->TTol3->Text);
//----------------------------------------------------
    double Mat3L = Mat3B;
    double Mat3H = Mat3B;
    double Off2 = Off2B;
    double Off3 = Off3B;
    double Ref1L = 0;
    double Ref1H = 0;
    double Ref2L = 0;
    double Ref2H = 0;
    double Ref3L = 0;
    double Ref3H = 0;
    double x = 0;
```

VI - LOSLO software code written in C++ controls the two prism angles to minimize dispersion.

```
double loop;
if (Mat3I != 0){
    if (Mat3B != Mat3E) loop = 1/((Mat3E-Mat3B)/Mat3I)*100;}
double count = 0;
if (Mat3E == Mat3B){
    p = 100;
    Synchronize(Progress);}
double Range;
Range = .2;
if (Mat3I == 0)
{
    Mat3I = 1;
    Mat3H = Mat3B;
    Mat3L = Mat3E;
    Range = Mat3L-Mat3H;
    p = 100;
    Synchronize(Progress);
};
while (Mat3H <= Mat3E)
{
    while (Mat3L <= Mat3H + Range)
    {
        while (Off2 <= Off2E)
        {
            while (Off3 <= Off3E)
            {
                if (MainForm->Start->Enabled)
                {
                    Ref3L = 0;
                    Ref3H = 0;
                    Ref1L = asin(sin(Inc1)/Mat2L);
                    Ref1H = asin(sin(Inc1)/Mat2H);
                    Ref2L = asin(Mat2L * sin(Ref1L-Off2)/Mat3L);
                    Ref2H = asin(Mat2H * sin(Ref1H-Off2)/Mat3H);
                    x = Mat3L * sin(Ref2L-Off3);
                    if (fabs(x) < 1) Ref3L = asin(x)+Off2+Off3;
                    x = Mat3H * sin(Ref2H-Off3);
                    if (fabs(x) < 1) Ref3H = asin(x)+Off2+Off3;
                    double Rel1 = Ref3L - Ref3H;
                    if (fabs(Rel1) < Tol1)
                    {
                        if (Ref3L != 0 && Ref3H != 0)
                        {
                            if (MainForm->List->Items->Count > 20000)
                            {
                                MainForm->Start->Caption = "Next";
                                Suspend( );
                            };
                            AnsiString Inc1a= Inc1;
                            AnsiString Off2a = Off2;
                            AnsiString Off3a = Off3;
                            AnsiString Mat3La = AnsiString(Mat3L);
                            AnsiString Mat3Ha = AnsiString(Mat3H);
                            AnsiString Ref3L1 = AnsiString(Ref3L);
                            AnsiString Ref3H1 = AnsiString(Ref3H);
                            AnsiString Rel1a = AnsiString(Rel1);
                            if (Inc2 == Inc1) MainForm->List->Items->Add(" " + Inc1a + " " + Off2a + " " + Off3a + " " + Mat3La + " " + Mat3Ha + " " + Ref3L1 + " " + Ref3H1 + " " + Rel1);
                            else
                            {
                                Ref3L=0;
                                Ref3H=0;
                                Ref1L = asin(sin(Inc2)/Mat2L);
                                Ref1H = asin(sin(Inc2)/Mat2H);
                                Ref2L = asin(Mat2L * sin(Ref1L-Off2)/Mat3L);
                                Ref2H = asin(Mat2H * sin(Ref1H-Off2)/Mat3H);
                                x = Mat3L * sin(Ref2L-Off3);
                                if (fabs(x) < 1) Ref3L = asin(x)+Off2+Off3;
                                x = Mat3H * sin(Ref2H-Off3);
                                if (fabs(x) < 1) Ref3H = asin(x)+Off2+Off3;
                                double Rel2 = Ref3L - Ref3H;
                                if (fabs(Rel2) <Tol2)
                                {
                                    if (Ref3L != 0 && Ref3H != 0)
                                    {
                                        AnsiString Inc2a = Inc2;
                                        AnsiString Ref3L2 = AnsiString(Ref3L);
                                        AnsiString Ref3H2 = AnsiString(Ref3H);
                                        AnsiString Rel2a = AnsiString(Rel2);
                                        if (Inc3 == Inc2)
                                        {
                                            MainForm->List->Items->Add(" " + Inc1a + " " + Off2a + " " + Off3a + " " + Mat3La + " " + Mat3Ha + " " + Ref3L1 + " " + Ref3H1 + " " + Rel1);
                                            MainForm->List->Items->Add (" " + Inc2a + " " + Off2a + " " + Off3a + " " + Mat3La + " " + Mat3Ha + " "+ Ref3L2 + " " + Ref3H2 + " " + Rel2);
                                        }
                                        else
                                        {
                                            Ref3L=0;
                                            Ref3H=0;
                                            Ref1L = asin(sin(Inc3)/Mat2L);
                                            Ref1H = asin(sin(Inc3)/Mat2H);
                                            Ref2L = asin(Mat2L * sin(Ref1L-Off2)/Mat3L);
                                            Ref2H = asin(Mat2H * sin(Ref1H-Off2)/Mat3H);
                                            x = Mat3L * sin(Ref2L-Off3);
                                            if (fabs(x) < 1) Ref3L = asin(x)+Off2+Off3;
                                            x = Mat3H * sin(Ref2H - Off3);
                                            if (fabs(x) < 1) Ref3H = asin(x)+Off2+Off3;
                                            double Rel3 = (Ref3L - Ref3H);
                                            if (fabs(Rel3) < Tol3)
                                            {
                                                if (Ref3L != 0 && Ref3H != 0)
                                                {
                                                    AnsiString Inc3a = Inc3;
                                                    AnsiString Ref3L3 = AnsiString(Ref3L);
                                                    AnsiString Ref3H3 = AnsiString(Ref3H);
                                                    AnsiString Rel3a = AnsiString(Rel3);
                                                    MainForm->List->Items->Add (" " + Inc1a + " " + Off2a + " " + Off3a + " " + Mat3La + " " + Mat3Ha + " " + Ref3L1 + " " + Ref3H1 + " " + Rel1);
                                                    MainForm->List->Items->Add (" " + Inc2a + " " + Off2a + " " + Off3a + " " + Mat3La + " " + Mat3Ha + " " + Ref3L2 + " " + Ref3H2 + " " + Rel2);
                                                    MainForm->List->Items->Add (" " + Inc3a + " " + Off2a + " " + Off3a + " " + Mat3La + " " + Mat3Ha + " " + Ref3L3 + " " + Ref3H3 + " " + Rel3);
                                                };
                                            }
                                        };
                                    };
                                };
                            };
                            Off3 = Off3 + Off3I;
                        }
                        else {
                            Mat3L = 2;
                            Mat3H = 2;
                            Off2 = 2;
                            Off3 = 2;
                            Off2B = 2;
                            Off3B = 2;
                            MainForm->Start->Enabled = true;}
                    }
                    Off2 = Off2 + Off2I;
                    Off3 = Off3B;
                }
                Mat3L = Mat3L + Mat3I;
                Off2 = Off2B;
            }
            Mat3H = Mat3H + Mat3I;
            Mat3L = Mat3H;
```

```
VI - LOSLO software code written in C++ controls the two prism
            angles to minimize dispersion.

count = count + loop;
    p = int(count);
    Synchronize(Progress);
}
p = 0;
Synchronize(Progress);
if (MainForm->Start->Caption == "Stop")
    MainForm->Start->Caption = "Start";
    MainForm->Start->Enabled=true;
}
//------------------------------------------------------------
```

I claim:

1. An optical system adapted for selecting the resultant trajectory of an incident beam of electromagnetic energy comprising:
   a) a first variable prism;
   b) a second variable prism;
   c) a computer in communication with at least one said variable prism so as to send a signal to vary said prism's affect on said resultant trajectory; and
   d) wherein spectral dispersion of said beam caused by the first prism is reduced by the second prism.

2. The optical system described in 1, wherein a means is provided for altering the temperature of at least one said variable prism.

3. The optical system described in 1, wherein a means is provided for mounting said system within the wall of a building.

4. The optical system described 1, wherein a means is provided for mounting said system on a vehicle.

5. The optical system described in 1, further including an array of prisms similar to said first variable prism wherein constituent prisms of said array are operated in unison to function as one large variable prism.

6. The optical system described in 1, wherein the shape of at least one said variable prism is alterable due to the elastic properties of a membrane through which said incident beam must pass before achieving said resultant trajectory.

7. An optical system adapted for selecting the resultant direction of an incident beam of electromagnetic energy comprising:
   a) a first variable prism;
   b) a second variable prism;
   c) a means to adjust the temperature of at least one said prism; and
   d) wherein spectral dispersion of said beam caused by the first prism is reduced by the second prism.

8. The optical system described in 7, wherein a computer is in communication with at least one said variable prism so as to send a signal to vary said prism's affect on said resultant trajectory.

9. The optical system described in 7, wherein a means is provided for mounting said system within the wall of a building.

10. The optical system described in 7, wherein a means is provided for mounting said system on a vehicle.

11. The optical system described in 7, further including an array of prisms similar to said first variable prism wherein constituent prisms of said array are operated in unison to function as one large variable prism.

12. The optical system described in 7, wherein the shape of at least one said variable prism alterable due to the elastic properties of a membrane through which said incident beam must pass before achieving said resultant trajectory.

13. An optical system adapted for selecting the resultant direction of an incident beam of electromagnetic energy comprising:
   a) a first variable prism array consisting of at least two similar prisms operated in unison;
   b) a second variable prism array consisting of at least two similar prisms operated in unison; and
   d) wherein said beam passing through the first prism array experiences spectral dispersion which is reduced by the second prism array.

14. The optical system described in 13, wherein a computer is in communication with at least one said prism so as to send a signal to vary said prism's affect on said resultant beam.

15. The optical system described in 13, wherein a means is provided for mounting said system within the wall of a building.

16. The optical system described in 13, wherein a means is provided for mounting said system on a vehicle.

17. The optical system described in 13, wherein a means is provided for altering the temperature of at least one said prism.

18. The optical system described in 13, wherein the shape of at least one prism within one said variable prism array is alterable due to the elastic properties of a membrane through which said incident beam must pass before achieving said resultant direction.

19. An optical system adapted for selecting the resultant direction of an incident beam of electromagnetic energy comprising:
   a) a first variable prism;
   b) a second variable prism;
   c) wherein the shape of at least one said prism is alterable due to the elastic properties of a membrane through which said incident beam must pass before achieving said resultant direction; and
   d) wherein spectral dispersion caused by the first prism is reduced by the second prism.

20. The optical system described in 19, wherein a computer is in communication with at least one said variable prism so as to send a signal to vary said prism's affect on said resultant trajectory.

21. The optical system described in 19, wherein a means is provided for mounting said system within the wall of a building.

22. The optical system described in 19, wherein a means is provided for mounting said system on a vehicle.

23. The optical system described in 19, further including an array of prisms similar to said first variable prism wherein constituent prisms of said array are operated in unison to function as one large variable prism.

24. The optical system described in 19, wherein a means is provided for altering the temperature of at least one said variable prism.

* * * * *